US008933363B2

(12) United States Patent
Hebert et al.

(10) Patent No.: US 8,933,363 B2
(45) Date of Patent: Jan. 13, 2015

(54) METHOD AND APPARATUS FOR RECYCLING SHIELD GAS IN A PLASMA ARC TORCH

(75) Inventors: Brandon Hebert, Williamston, VT (US); Chris Conway, Wilmot, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 851 days.

(21) Appl. No.: 13/023,660

(22) Filed: Feb. 9, 2011

(65) Prior Publication Data

US 2012/0199563 A1   Aug. 9, 2012

(51) Int. Cl.
*B23K 10/00* (2006.01)
*H05H 1/34* (2006.01)
*B23K 10/02* (2006.01)

(52) U.S. Cl.
CPC ................. *H05H 1/34* (2013.01); *B23K 10/00* (2013.01); *B23K 10/003* (2013.01); *B23K 10/006* (2013.01); *B23K 10/02* (2013.01); *H05H 2001/3489* (2013.01)
USPC .............. 219/121.48; 219/121.51; 219/121.5; 219/121.49

(58) Field of Classification Search
CPC ....................................... H05H 1/34

USPC ......... 219/121.5, 121.51, 121.52, 121.48, 75, 219/121.55
See application file for complete search history.

(56) References Cited

U.S. PATENT DOCUMENTS

| 5,856,647 A | 1/1999 | Luo |
| 5,886,315 A * | 3/1999 | Lu et al. .................... 219/121.57 |
| 6,362,450 B1 | 3/2002 | Severance, Jr. |
| 6,703,581 B2 | 3/2004 | Jones et al. |
| 8,089,025 B2 * | 1/2012 | Sanders .................... 219/121.49 |

FOREIGN PATENT DOCUMENTS

WO   03/072294   9/2003

* cited by examiner

*Primary Examiner* — Mark Paschall
(74) *Attorney, Agent, or Firm* — Brinks Gilson & Lione

(57) ABSTRACT

A method of operating a plasma arc torch is provided that includes directing a first portion of gas into a plasma chamber, directing a second portion of the gas to initiate a pilot arc in the plasma chamber, and redirecting the second portion of the gas to form a shield gas flow rather than venting the second portion to atmosphere. A plasma arc torch for this method includes a start cartridge disposed between an electrode and a tip for initiating the pilot arc. The start cartridge defines at least one redirect gas passageway in fluid communication with a shield gas passageway. The second portion of gas is redirected through the at least one redirect gas passageway and into the shield gas passageway.

20 Claims, 25 Drawing Sheets

METHOD AND APPARATUS FOR RECYCLING SHIELD GAS IN A PLASMA ARC TORCH

FIELD

The present disclosure relates to plasma arc torches and more specifically to devices and methods for controlling fluid flow in a plasma arc torch.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

One of two methods is typically used for initiating the pilot arc between the electrode and the tip. In the first method, commonly referred to as a "high frequency" or "high voltage" start, a high potential is applied across the electrode and the tip sufficient to create an arc in the gap between the electrode and the tip. Accordingly, the first method is also referred to as a "non-contact" start, since the electrode and the tip do not make physical contact to generate the pilot arc. In the second method, commonly referred to as a "contact start," the electrode and the tip are brought into contact and are gradually separated, thereby drawing an arc between the electrode and the tip. The contact start method thus allows an arc to be initiated at much lower potentials since the distance between the electrode and the tip is much smaller.

To operate the contact start torches, working gas from a source of gas is generally split into three streams inside the torches. A first portion of gas is used as a plasma gas to generate the main plasma stream. A second portion of gas is used as shield gas for stabilizing the plasma gas and controlling cut qualify. The second portion of gas also provides cooling to consumable components of the torches. A third portion of gas is used to separate the electrode from the tip to draw the pilot arc between the electrode and the tip and is vented outside the torches after the pilot arc is generated. Generally, a high percentage of the working gas is used to separate the tip from the electrode and vented outside the plasma arc torch. This portion of working gas is undesirably wasted.

SUMMARY

In one form of the present disclosure, a method of operating a plasma arc torch includes providing a source of gas and electric power, directing a first portion of gas flowing from the source of gas into a plasma chamber, directing a second portion of the gas flowing from the source of gas to initiate a pilot arc in the plasma chamber, and redirecting the second portion of the gas to form at least a portion of a shield gas flow rather than venting the second portion to atmosphere.

In another form, a method of operating a plasma arc torch includes redirecting a portion of working gas that is used to initiate a pilot arc through passageways to form at least a portion of a shield gas flow rather than venting the working gas to atmosphere.

In still another form, a plasma arc torch includes an electrode, a tip spaced distally from the electrode, a shield cup surrounding the tip and forming a portion of a shield gas passageway therebetween, and a start cartridge disposed between the electrode and the tip for initiating a pilot arc. The start cartridge defines at least one redirect gas passageway in fluid communication with the shield gas passageway. When a working gas is directed into the start cartridge to initiate the pilot arc, at least a portion of the working gas is redirected through the at least one redirect gas passageway and into the shield gas passageway to form at least a portion of a shield gas flow around the tip.

In yet another form of the present disclosure, a start cartridge is disposed between an electrode and a tip for initiating a pilot arc in a plasma arc torch. The start cartridge defines at least one redirect gas passageway in fluid communication with a shield gas passageway. When a working gas is directed into the start cartridge to initiate the pilot arc, at least a portion of the working gas is redirected through the at least one redirect gas passageway and into the shield gas passageway to form at least a portion of a shield gas flow around the tip.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
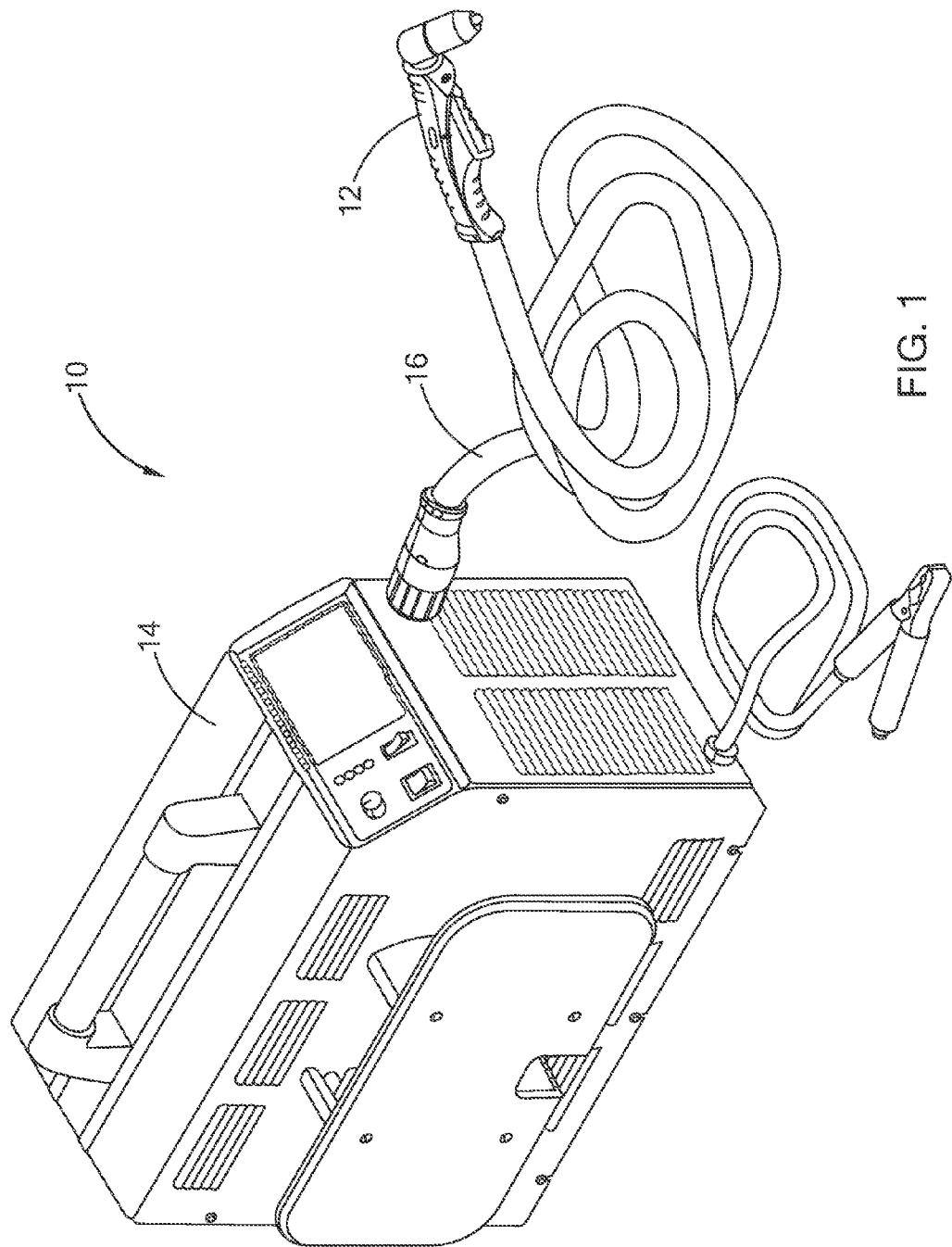
FIG. 1 is a perspective view of a manually operated plasma arc apparatus in accordance with the principles of the present disclosure.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Referring to FIG. 1, a contact start plasma arc torch according to the present disclosure is generally operable with a manually operated plasma arc apparatus as indicated by reference numeral 10. Typically, the manually operated plasma arc apparatus 10 comprises the contact start plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present disclosure. Furthermore, the terms "biased" or "biasing" should not be construed as meaning an electrical bias or voltage as often used in the electrical field.

Figure 2:
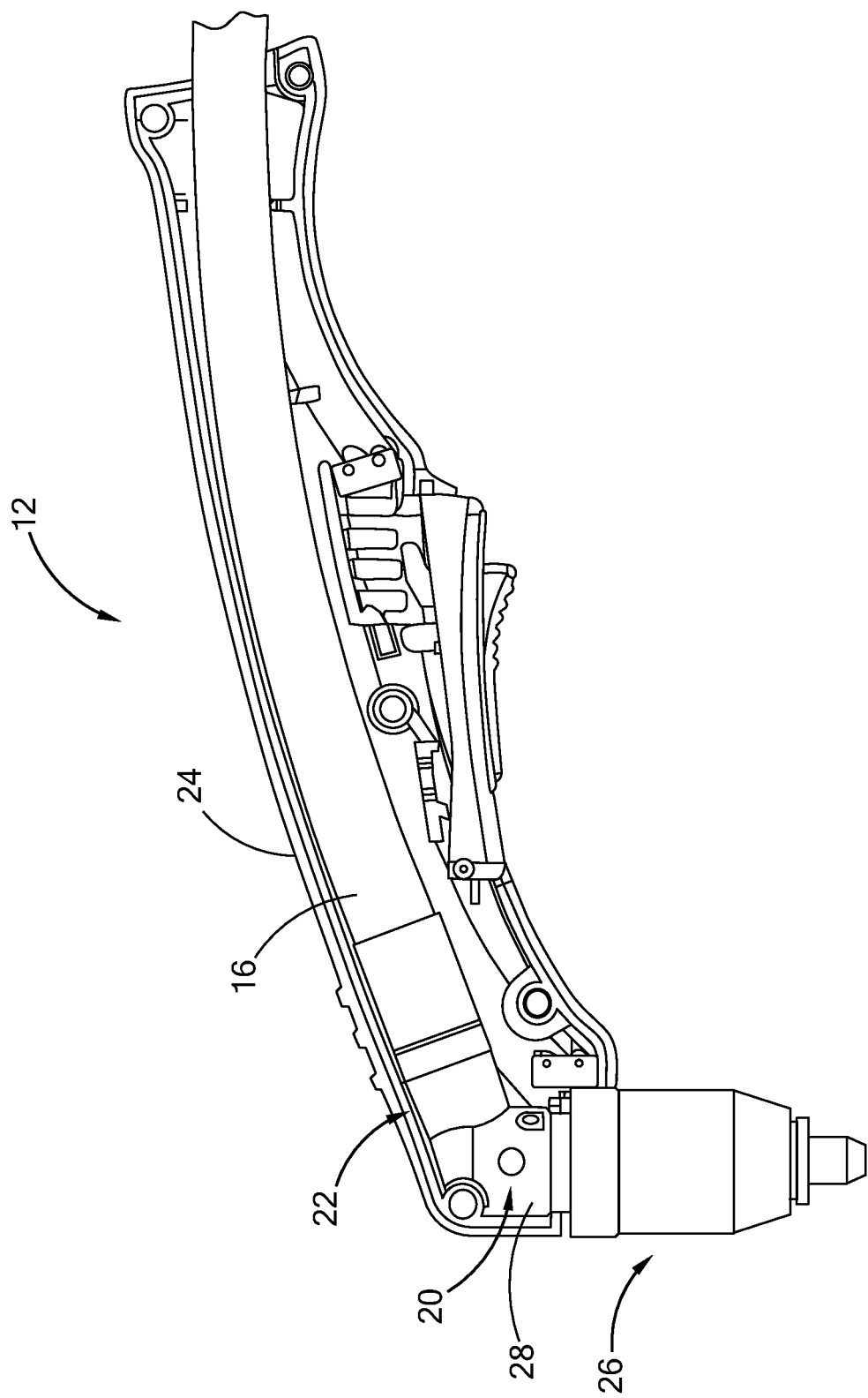
FIG. 2 is a side view of a torch head disposed within a plasma arc torch and constructed in accordance with the principles of the present disclosure.
Figure 3:
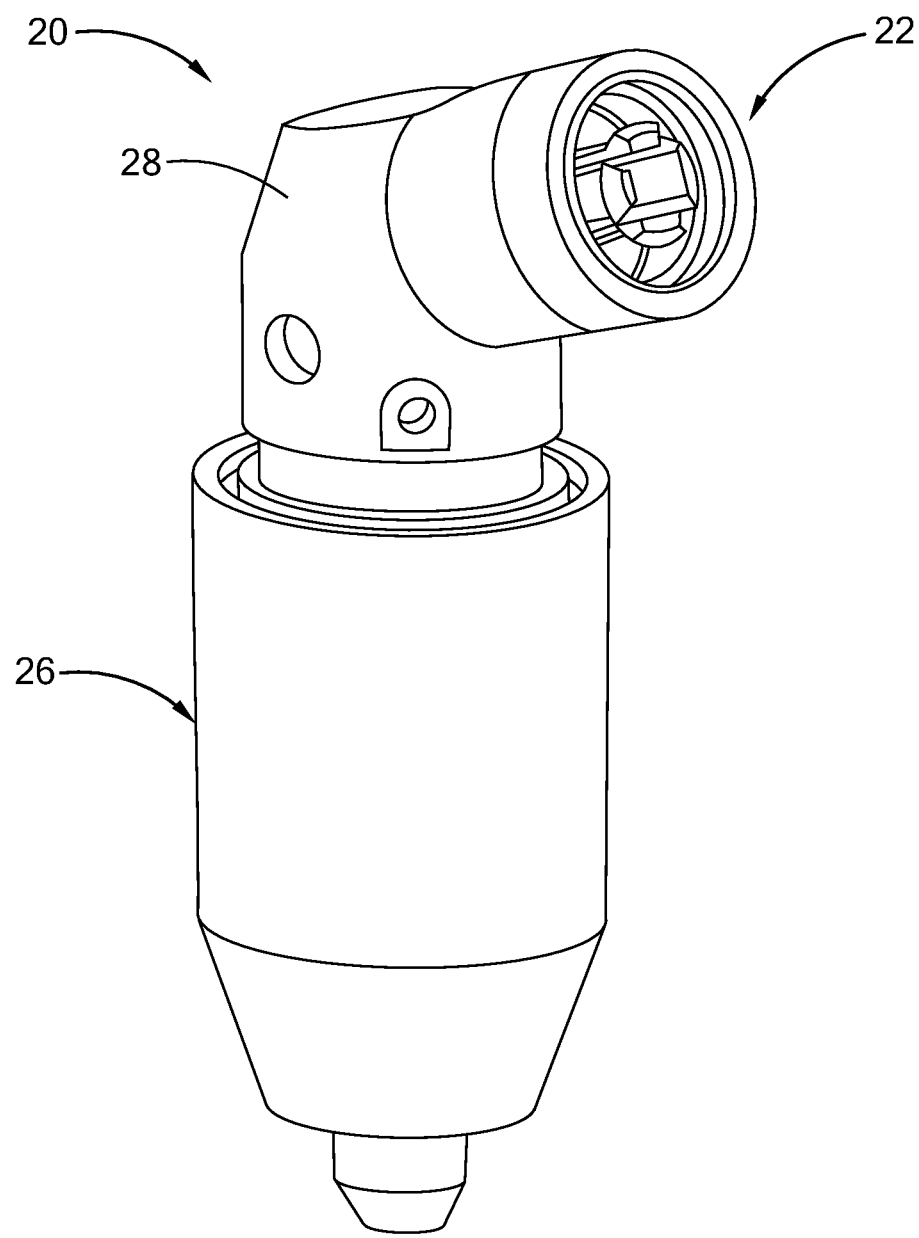
FIG. 3 is a perspective view of a torch head constructed in accordance with the principles of the present disclosure.

Referring now to FIGS. 2 and 3, a torch head for use in the contact start plasma arc torch 12 of the present disclosure is illustrated and generally indicated by reference numeral 20. As shown, the torch head 20 defines a proximal end 22 that is disposed within a handle 24 (one half of which is removed for clarity) of the plasma arc torch 12 and a distal end 26, to which a plurality of consumable components are secured, as described in greater detail below. The proximal end 22 is also adapted for connection to the torch lead 16, which provides both gas and electric power for operation of the contact start plasma arc torch 12. The connection to the torch lead 16 may comprise a quick disconnect such as that disclosed in co-owned U.S. Pat. No. 7,429,715, titled "Modular Plasma Arc Torch," the contents of which are incorporated herein by reference. Further, as described herein, proximal direction or proximally is the direction towards the proximal end 22, and distal direction or distally is the direction towards the distal end 26. The torch head 20 further comprises a torch head housing 28 in which fixed components of the torch head 20 are disposed.

Figure 4:
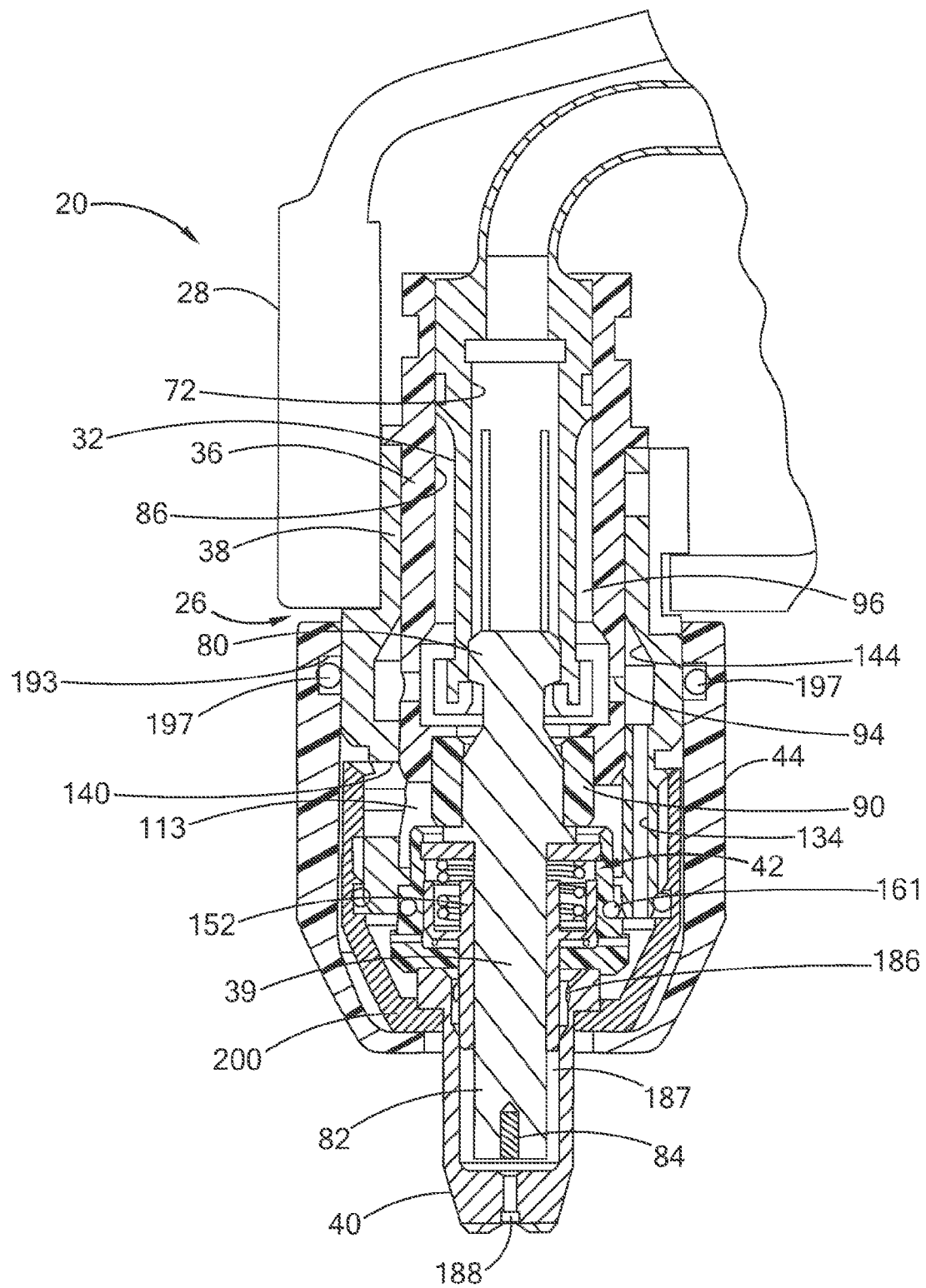
FIG. 4 is a cross-sectional view of a torch head and consumable components constructed in accordance with the principles of the present disclosure.
Figure 5:
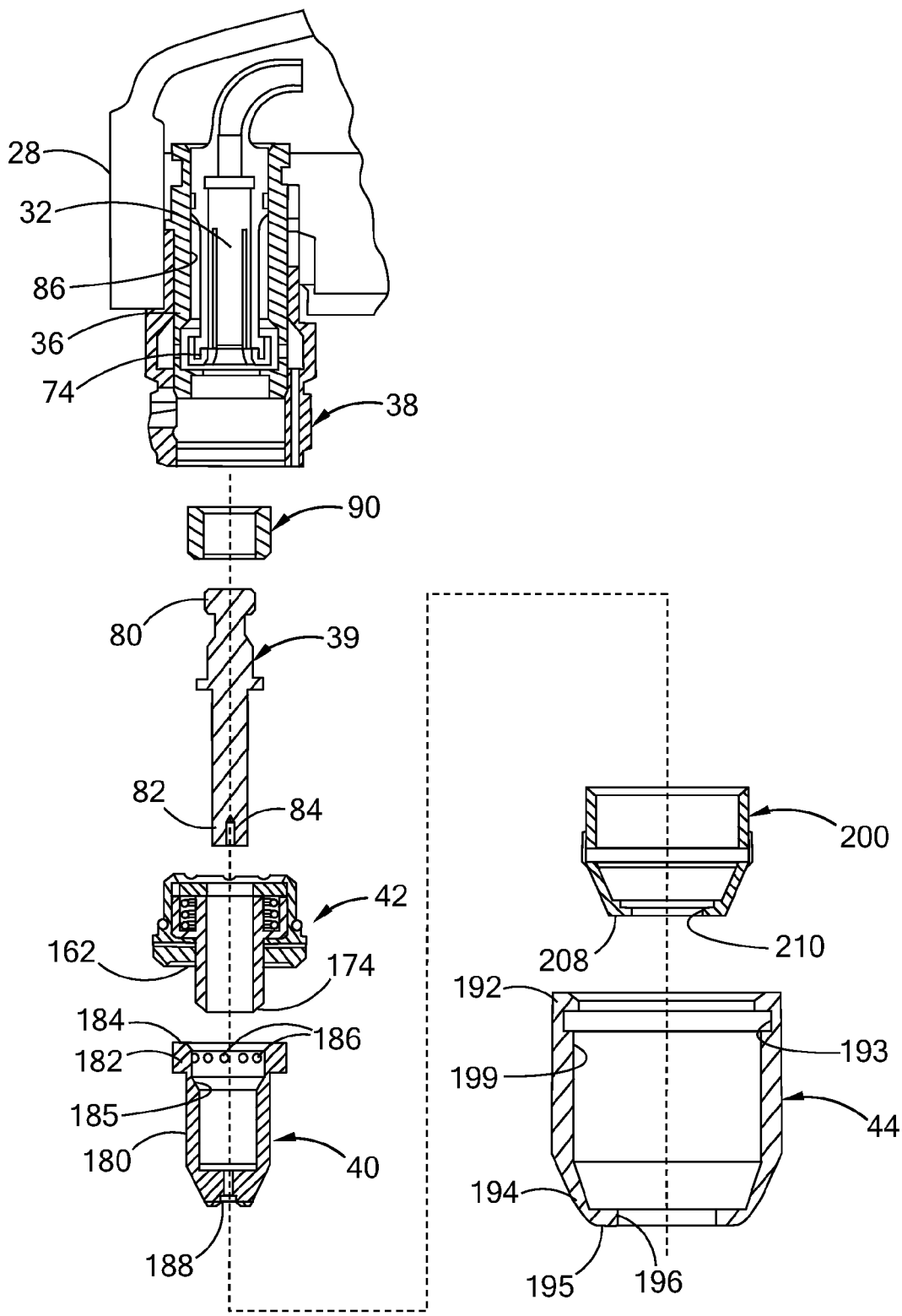
FIG. 5 is an exploded view of a torch head and consumable components constructed in accordance with the principles of the present disclosure.

Referring to FIGS. 4 and 5, the fixed components of the torch head 20 comprise a cathode body 32 that has relatively negative potential, an anode member 38 that functions as both an anode and a gas distributor (as described in greater detail below) and has relatively positive potential, and an insulating member 36 that is disposed between the cathode body 32 and the anode member 38 and insulates the cathode body 32 from the anode member 38.

A plurality of consumable components are generally secured to the distal end 26 of the torch head 20 and comprise an electrode 39 connected to the cathode body 32, a tip 40, a start cartridge 42 that is used to draw a pilot arc for starting the torch as described in greater detail below, and a shield cup 44. The shield cup 44 secures the consumable components to the distal end 26 of the torch head 20 and further insulates the consumable components from the surrounding area during operation of the torch. The shield cup 44 also positions and orients the consumable components, e.g., the start cartridge 42 and the tip 40, relative to one another for proper operation of the torch when the shield cup 44 is fully engaged with the torch head 20. The plurality of consumable components further include an electrode seat 90 disposed between the insulating member 36 and the electrode 39, and an insert 200 disposed between the anode member 38 and the shield cup 44.

As clearly shown in FIG. 4, an annular gap 70 is formed between the lower connecting portion 56 of the cathode body 32 and the insulating member 36 such that the radially outward movement of the prongs 60 is permitted. The cathode body 32 defines a central bore 72 that is in fluid communication with a source of gas in the power supply 14 through the torch lead 16. An insulating cap 74 is mounted on the free lower ends 66 of the cathode body 32. As clearly shown in FIG. 5, both the insulating member 36 and the insulating cap 74 are configured and positioned to inhibit electrical contact between an object other than the electrode 39 with the cathode body 32 to reduce the risk of torch malfunction should such an object be inserted into the cathode central bore 72.

Referring back to FIGS. 4 and 5, the electrode 39 is generally cylindrical and has a proximal connecting end 80 and a distal end 82. The proximal connecting end 80 of the electrode 39 is adapted for coaxial telescoping connection with the lower connecting portion 56 of the cathode body 32 about the longitudinal axis X as shown and described U.S. Pat. No. 6,163,008, which is commonly assigned with the present application and the contents of which are incorporated herein by reference in their entirety. In one form, the electrode 39 illustrated and described herein is constructed of copper, with an insert 84 of emissive material (e.g., hafnium) secured in a recess at the distal end 82 of the electrode 39 in a conventional manner.

Figure 6:
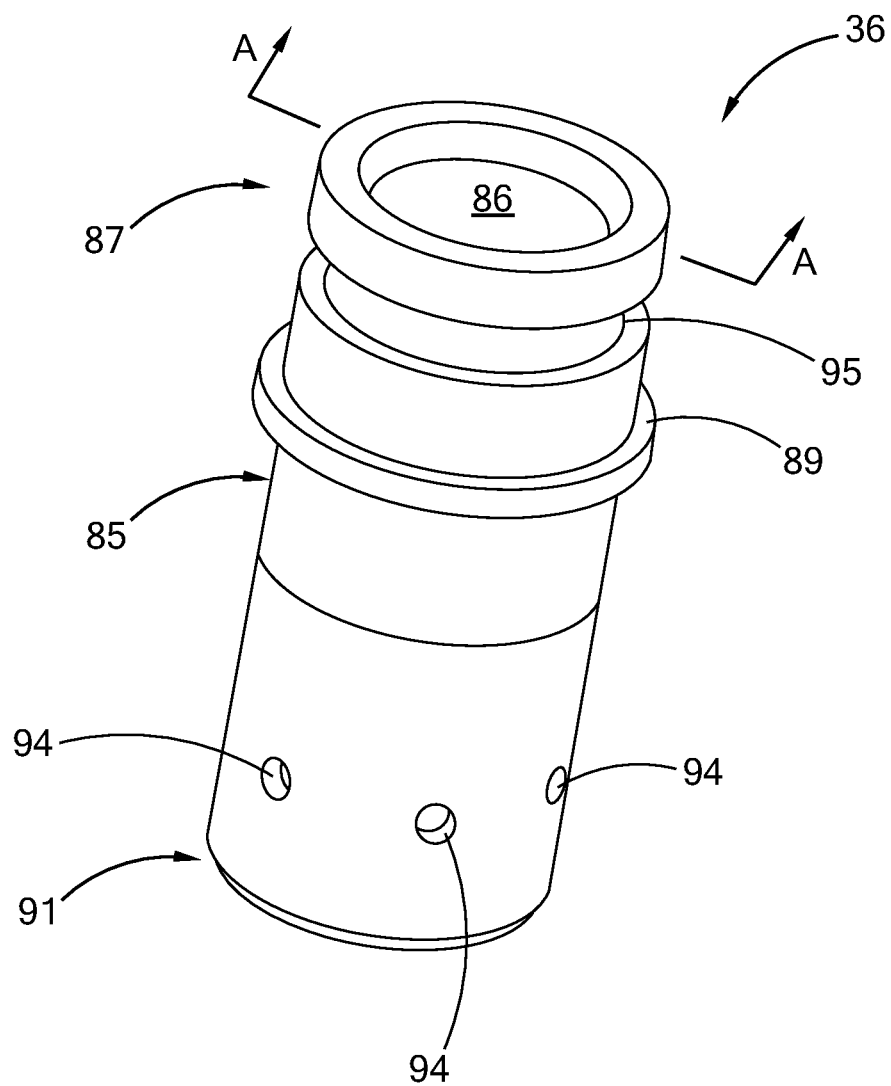
FIG. 6 is a perspective view of an insulating member constructed in accordance with the principles of the present disclosure.
Figure 7:
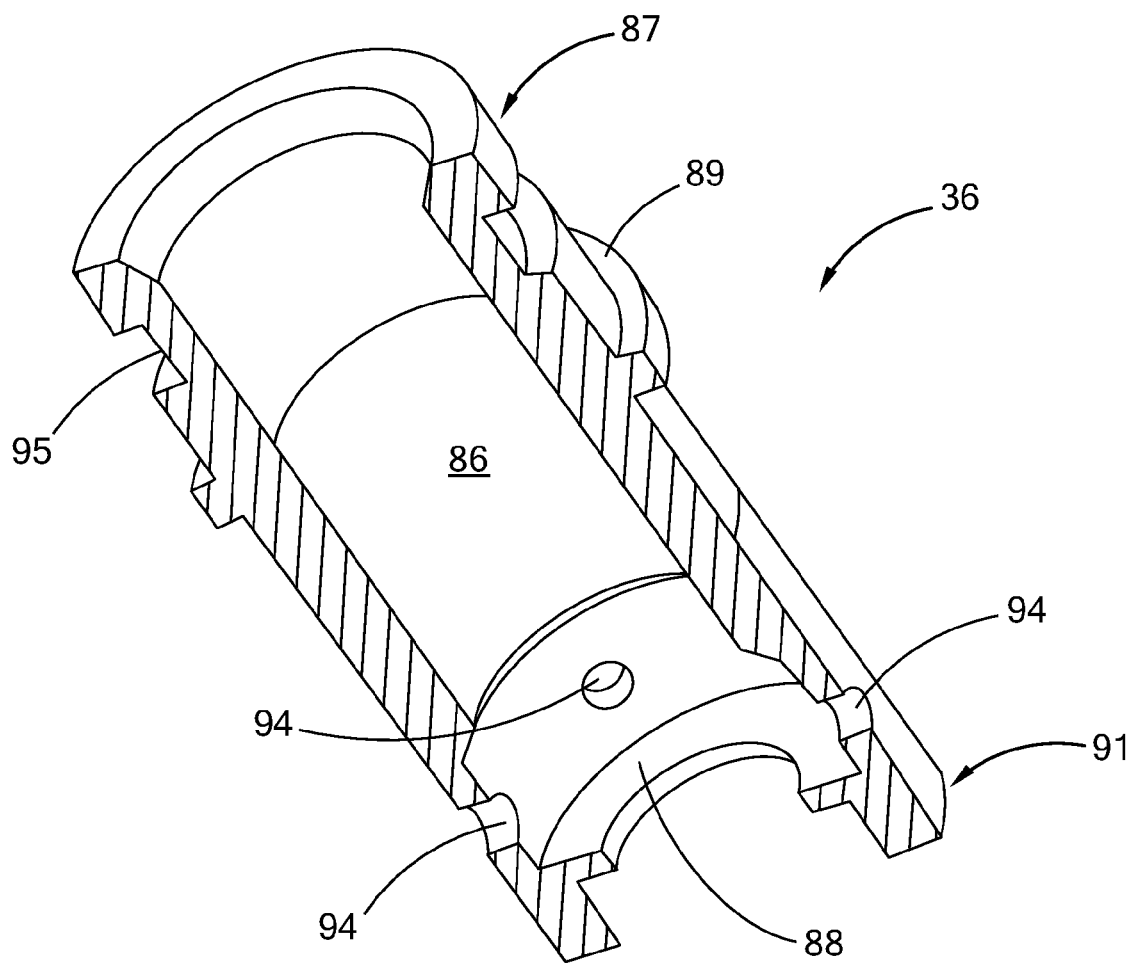
FIG. 7 is a perspective, cross-sectional view of an insulating member constructed in accordance with the principles of the present disclosure, taken along line A-A of FIG. 6.

With particular reference to FIGS. 6 and 7, the insulating member 36 comprises a generally cylindrical body 85 defining a proximal portion 87 and a distal portion 91. An internal bore 86 extends through the generally cylindrical body 85 and houses the cathode body 32 therein. The insulating member 36 further comprises an inner annular ring 88 at the distal portion 91 and an outer annular ring 89 at the proximal portion 87. The annular inner ring 88 abuts against the electrode seat 90 for proper positioning of the electrode 39 along the central longitudinal axis X of the plasma arc torch 12. The annular outer ring 89 abuts against a proximal face 92 (FIG. 9) of the anode member 38 for proper positioning of the anode member 38 along the central longitudinal axis X of the plasma arc torch 12. The insulating member 36 further defines an annular groove 95 at the proximate end 87.

As further shown, the insulating member 36 defines a plurality of radial vent holes 94 at the distal portion 91. When the insulating member 36 is disposed around the cathode body 32, a gas chamber 96 is formed between the cathode body 32 and the insulating member 36 and in fluid communication with the plurality of radial vent holes 94. As such, working gas flowing from the source of gas can be directed through the central bore 72 of the cathode body 32 and the vertical slots 62 of the cathode body 32 into the gas chamber 96 between the cathode body 32 and the insulating member 36. The working gas flowing into the gas chamber 96 is further directed outside the insulating member 36 and into a gas chamber formed between the insulating member 36 and the anode member 38 through the plurality of radial vent holes 94 as described in more detail below.

Referring to FIGS. 8 to 11, the anode member 38 is disposed around the insulating member 36 and connected to a positive side of the power supply. The anode member 38 includes a proximal portion 100 and a distal portion 102. A central bore 103 extends through the anode member 38. The proximal portion 100 defines a proximal space 125 therein for receiving the cathode body 32 and the insulating member 36. The distal portion 102 defines a distal space 127 therein. The proximal portion 100 further includes an upper cylindrical wall 104 and an intermediate cylindrical wall 108. The distal portion 102 further includes a lower cylindrical wall 106 proximate the intermediate cylindrical wall 108. The upper cylindrical wall 104 has an outside diameter smaller than the outside diameter of the intermediate cylindrical wall 108 such that an annular shoulder 110 is defined between the upper cylindrical wall 104 and the intermediate cylindrical wall 108. An annular groove 112 is defined between the lower cylindrical wall 106 and the intermediate cylindrical wall 108.

Figure 8:
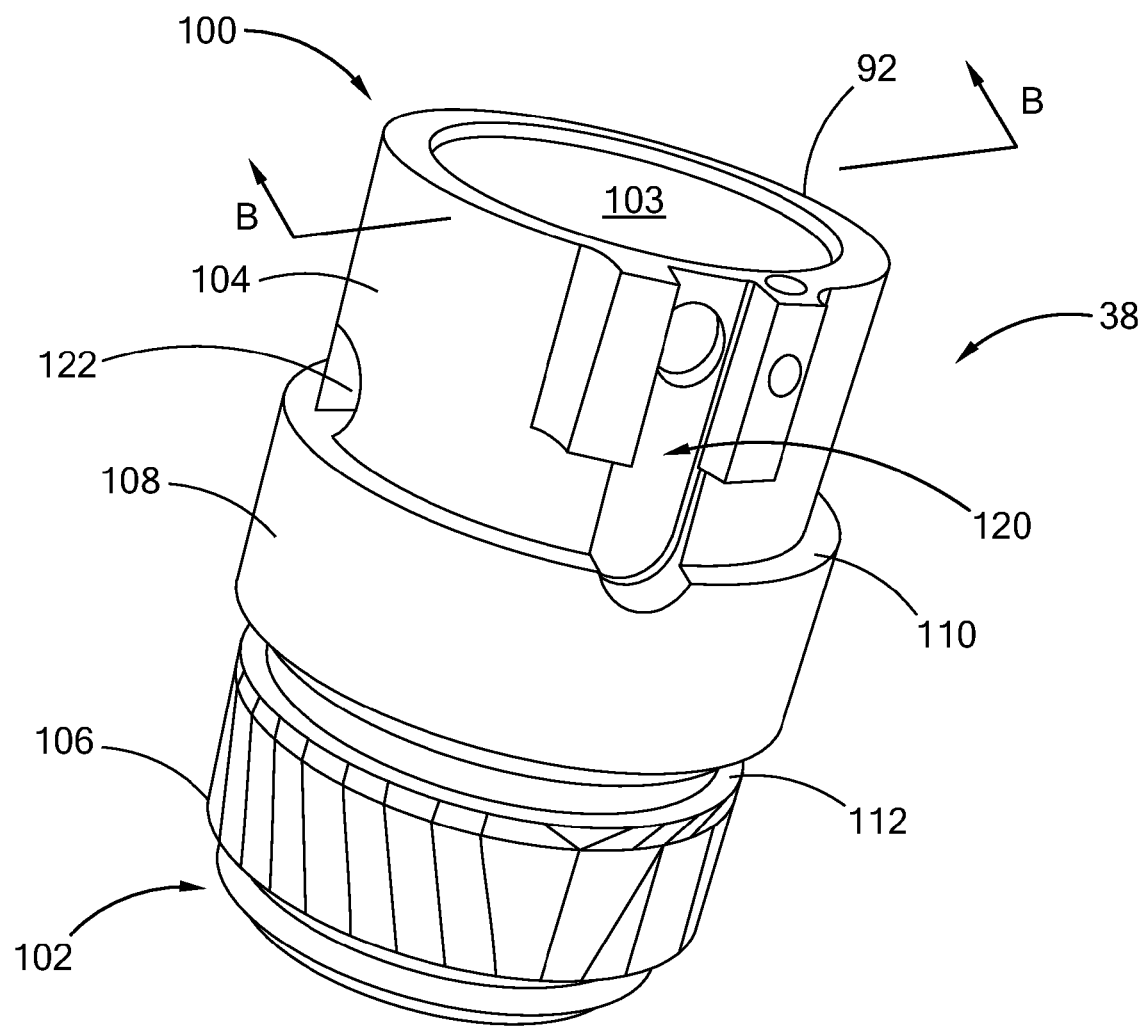
FIGS. 8 to 10 are perspective views of an anode member constructed in accordance with the principles of the present disclosure.
Figure 9:
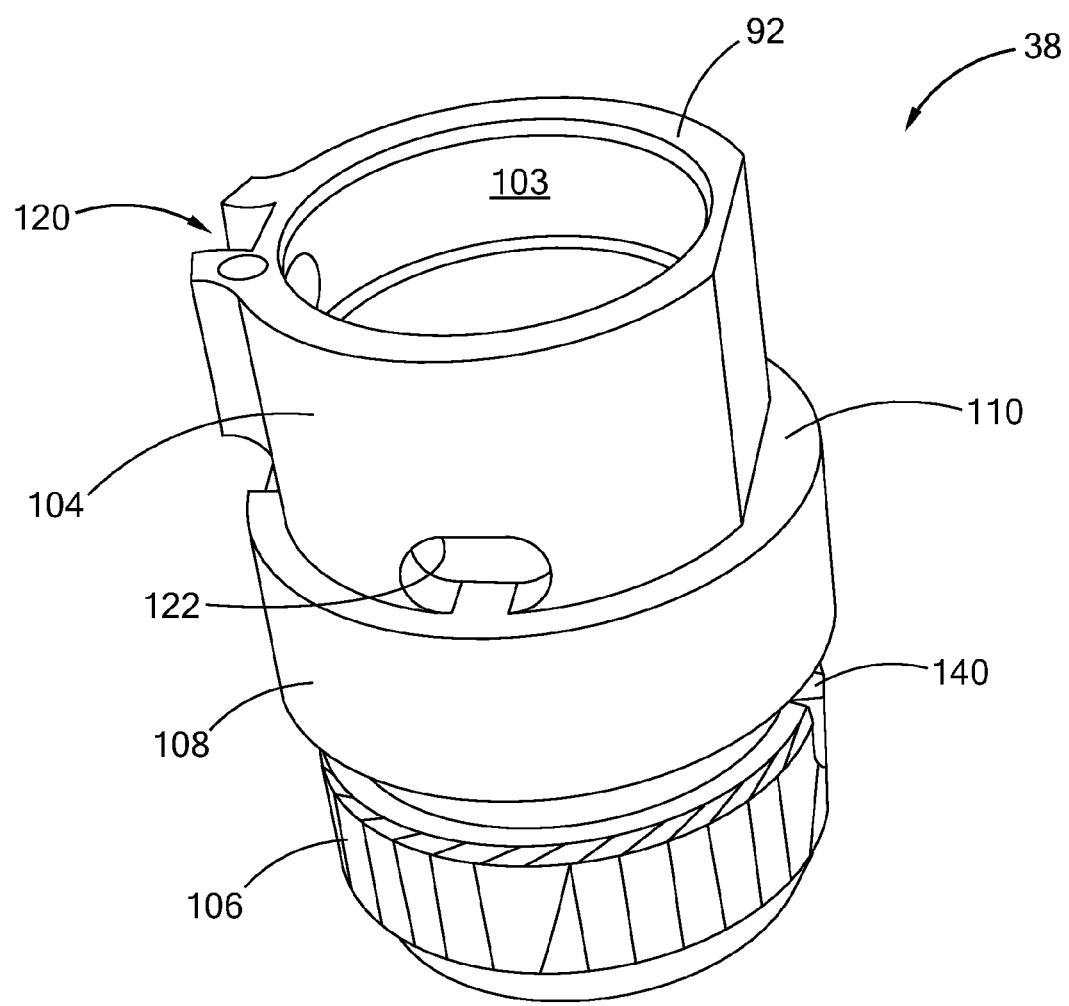

The upper cylindrical wall 104 includes a connecting section 120 that is adapted for connection to a parts-in-place (PIP) system (not shown). The upper cylindrical wall 104 defines a pair of positioning recesses 122 (only one is shown in FIGS. 8 and 9) diametrically formed in the upper cylindrical wall 104. The torch head housing may include corresponding projections (not shown) that can be received in the positioning recesses 122 so that the anode member 38 can be properly positioned in a rotational direction relative to the torch head housing 28.

Figure 11:
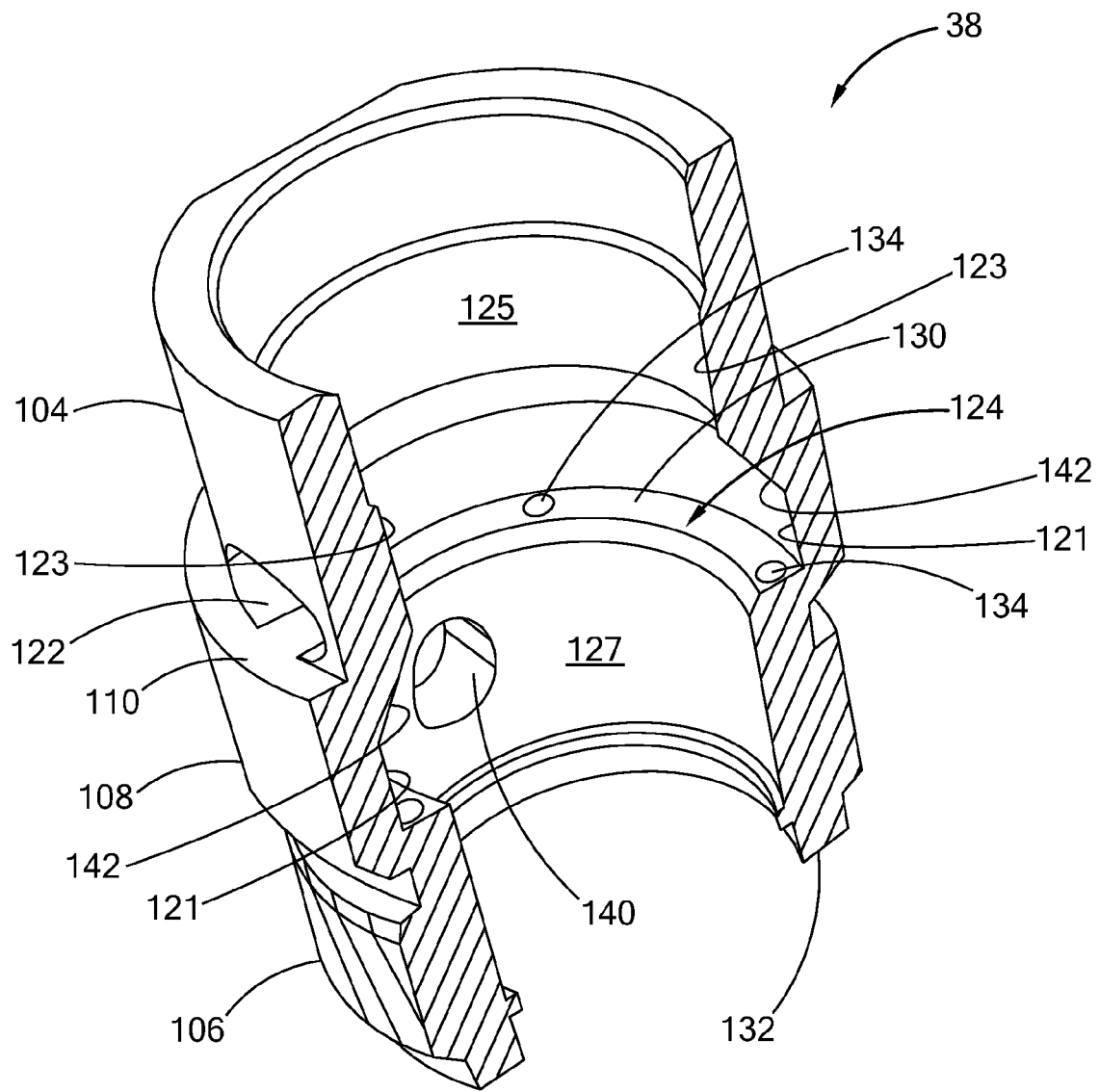
FIG. 11 is a perspective, cross-sectional view of an anode member constructed in accordance with the principles of the present disclosure, taken along line B-B of FIG. 8.

As clearly shown in FIG. 11, an annular flange 124 extends from a lower end of the intermediate cylindrical wall 108 and the lower cylindrical wall 106. The annular flange 124 includes a proximal face 130 and a distal face 132. A plurality of axial vent holes 134 extend through the proximal face 130 and the distal face 132. The lower cylindrical wall 106 of the anode member 38 defines a radial passageway 140.

The upper cylindrical wall 104 has an inside diameter less than that of the intermediate cylindrical wall 108. An inner surface 121 of the intermediate cylindrical wall 108 is recessed from an inner surface 123 of the upper cylindrical wall 104. A slant surface 142 connects the inner surface 121 of the intermediate cylindrical wall 108 and the inner surface 123 of the upper cylindrical wall 104. Accordingly, when the insulating member 36 is housed in the central bore 103 of the anode member 38, particularly the proximal space 125, a first gas receiving chamber 144 (FIG. 4) is formed between the insulating member 36 and the anode member 38 and proximate the inner surface 121 of the intermediate cylindrical wall 108 and the slant surface 142. The proximal face 130 of the annular inner flange 124 is disposed proximate the first gas receiving chamber 144 so that the plurality of axial holes 134 are in fluid communication with the first gas receiving chamber 144. The radial vent holes 94 of the insulating member 36 are formed such that the radial vent holes 94 are in fluid communication with the first gas receiving chamber 144. Accordingly, the working gas vented out from the insulating member 32 through the radial vent holes 94 is directed to the first gas receiving chamber 144 and is further directed distally through the axial vent holes 134 in the annular flange 124. The working gas is then vented out from the anode member 38 at the distal face 132 of the annular flange 124.

Figure 12:
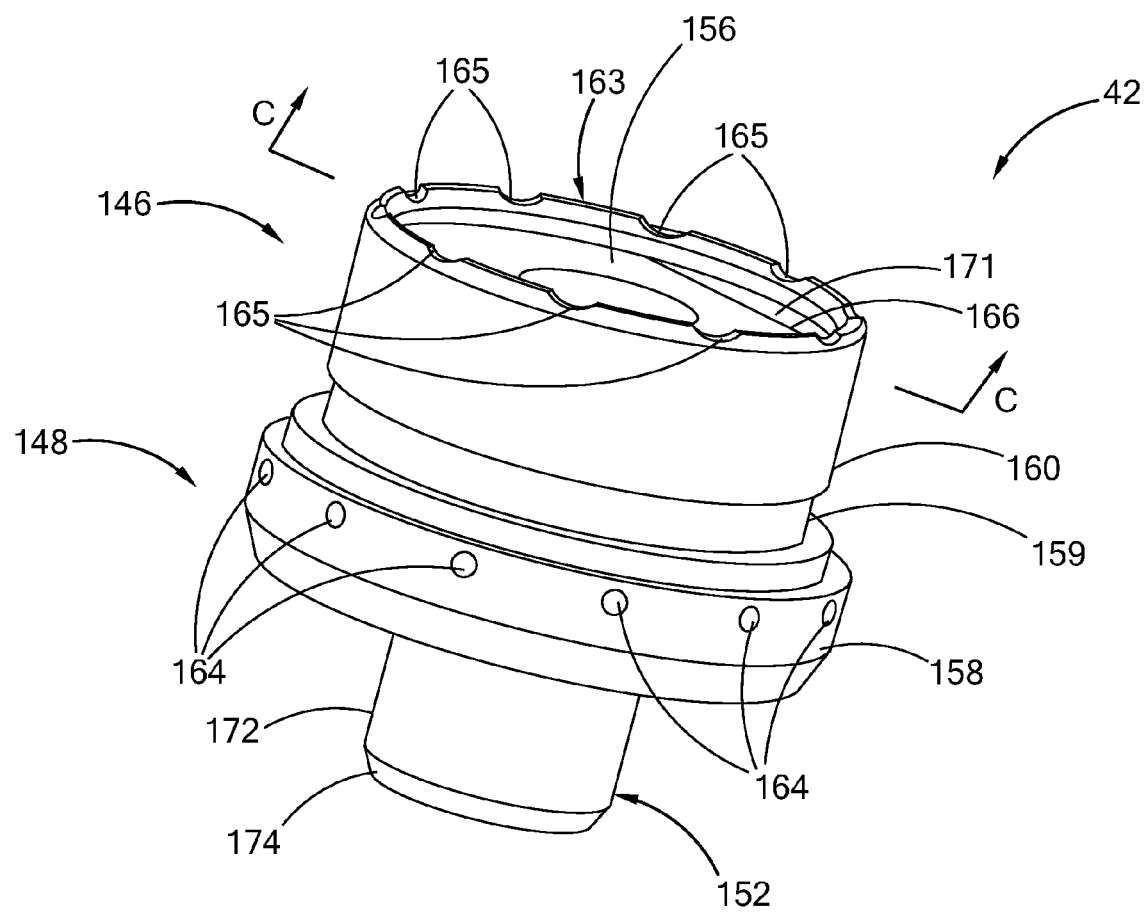
FIG. 12 is a perspective view of a start cartridge constructed in accordance with the principles of the present disclosure.
Figure 13:
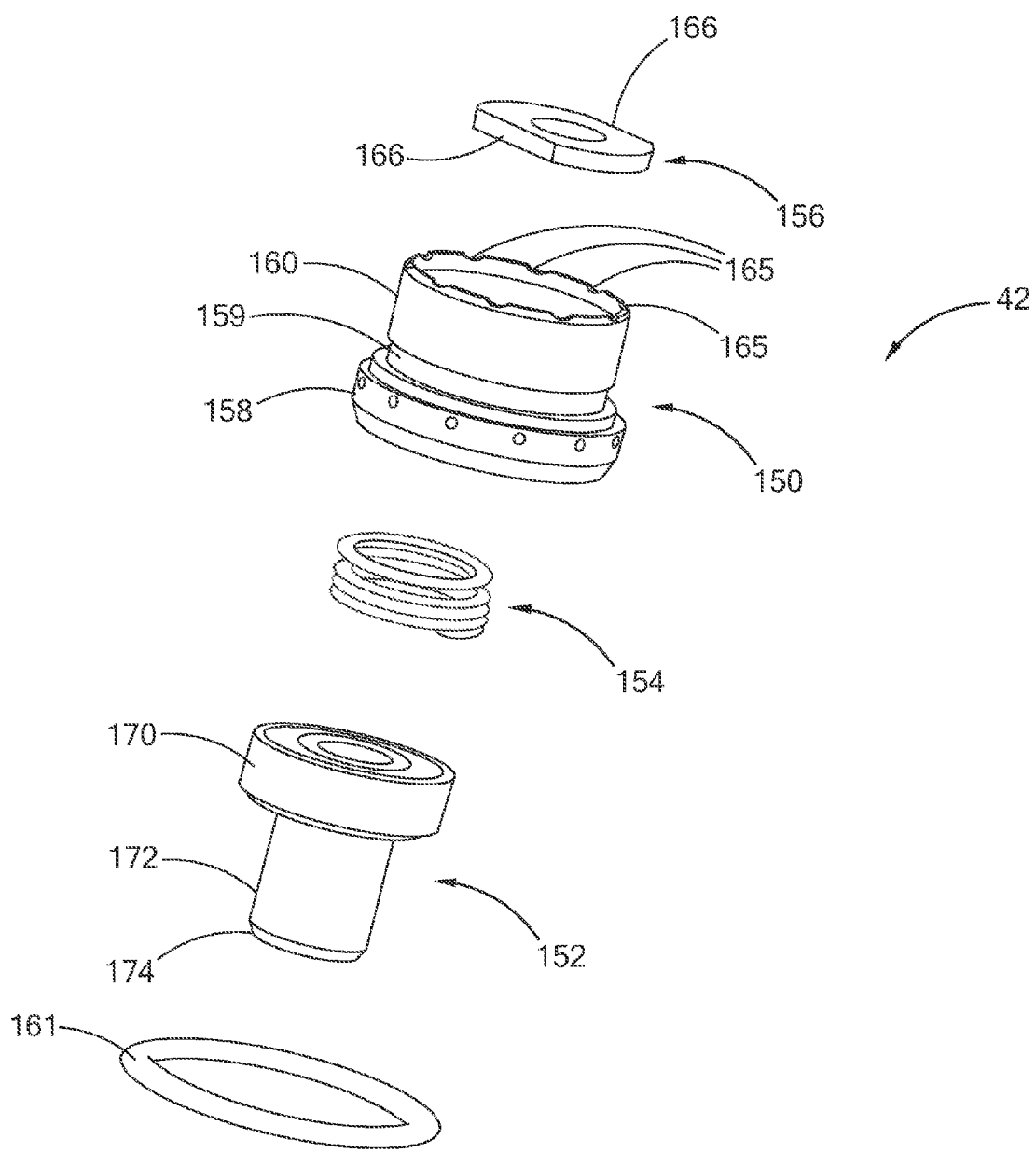
FIG. 13 is an explode view of a start cartridge constructed in accordance with the principles of the present disclosure.
Figure 14:
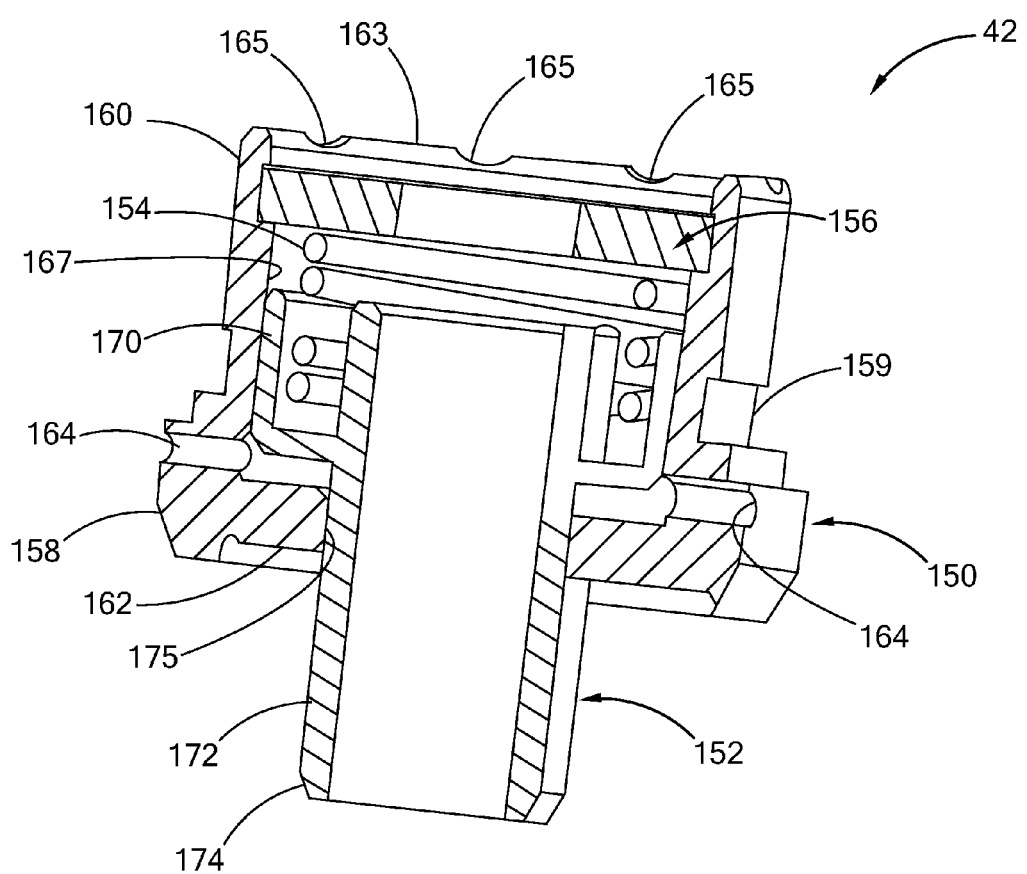
FIG. 14 is a cross-sectional view of a start cartridge constructed in accordance with the principles of the present disclosure, taken along line C-C of FIG. 12.

Referring to FIGS. 12 to 14, the start cartridge 42 comprises a proximal section 146 disposed inside the distal space 127 of the anode member 38 and a distal section 148 disposed outside the anode member 38. The proximal section 146 defines a plurality of redirect gas passageways 171. More specifically, the start cartridge 42 comprises a cartridge body 150, an initiator 152, a coil spring 154, and a restraining member 156. The coil spring 154 is housed within the cartridge body 150 and between the initiator 152 and the restraining member 156. The start cartridge 42 may be a single replaceable consumable component.

As further shown, the cartridge body 150 comprises a lower cylindrical portion 158, an upper cylindrical sidewall 160, and a recessed end wall 162 housed within the lower cylindrical portion 158. The upper cylindrical sidewall 160 is disposed in the distal space 127 of the anode member 38. The lower cylindrical portion 158 is disposed outside the anode member 38. An annular groove 159 is defined between the upper cylindrical sidewall 160 and the lower cylindrical portion 158 for receiving an o-ring 161. As clearly shown in FIG. 4, the o-ring 161 seals and retains the interface between the start cartridge 42 and the anode member 38.

As further shown, the upper cylindrical sidewall 162 defines a cartridge chamber 167 for receiving the coil spring 154 and a portion of the initiator 152. The cartridge body 150 further defines a series of radial gas holes 164 that extend radially through the lower cylindrical portion 158. The series of radial gas holes 164 direct a portion of the working gas into the cartridge chamber 167 of the cartridge body 150 to move the initiator 152 away from the tip 40 against the bias of the coil spring 154 as described in greater detail below.

The restraining member 156, which may be a substantially circular plate, is secured to the upper cylindrical sidewall 160 of the cartridge body 150 and recessed from a proximal face 163 of the cartridge body 150. The restraining member 156 is provided with a plurality of cutout portions 166 such that when the restraining member 156 is mounted to the cartridge body 150, the plurality of cutout portions 166 and the adjacent cartridge body 150 form a plurality of redirect gas passageways 171, through which the working gas is vented out from the cartridge chamber 167 of the cartridge body 150, as further described below. While not shown in the drawings, it is understood that the plurality of redirect gas passageways 171 may be formed through restraining member 156. The proximal face 163 of the cartridge body 150 defines a plurality of cutouts 165 to facilitate flow of the working gas out from the cartridge chamber 167.

As further shown, the initiator 152 includes an upper cylindrical portion 170, and a tubular portion 172 that defines a beveled contact surface 174. The tubular portion 172 of the initiator 152 projects distally through a central aperture 175 of the recessed end wall 162. The coil spring 154 is disposed within the cylindrical portion 170.

For example only, the initiator 152 is made of a conductive material such as copper or a copper alloy, the coil spring 154 is made of a steel material, and the cartridge body 150 is made of an electrically insulative material.

The initiator 152 is free to move axially along a central longitudinal axis X of the torch head 20 within the cartridge chamber 167 of the start cartridge 42. More particularly, the initiator 152 is axially movable relative to the tip 40 between a first, distal position corresponding to the idle mode of the torch, and a second, proximal position corresponding to the pilot mode of the torch. In the idle mode, the initiator 152 is in contact with the tip 40. In the pilot mode, the initiator 152 is separated from the tip 40, as will be described in more detail below.

Referring back to FIGS. 4 and 5, the tip 40, also commonly referred to as a nozzle, has a generally hollow configuration and is mounted over the distal portion of the electrode 39. The tip 40 comprises a hollow, generally cylindrical distal portion 180 and an annular flange 182 at a proximal end. The annular flange 182 defines a generally flat, proximal face 184 that seats against and seals with the recessed end wall 162 of the cartridge body 150 of the start cartridge 42.

The tip 40 includes a conical interior surface 185 between the annular flange 182 and the cylindrical distal portion 180 to be selectively contacted by the beveled contact surface 174 of the initiator 152. In the idle mode, the conical interior surface 185 is in contact with the beveled distal contact surface 174 of the initiator 152. The tip 40 further defines a plurality of radial gas holes 186 positioned around and through the annular flange 182.

As clearly shown in FIG. 4, the tip 40 is in a radially and longitudinally spaced relationship with the electrode 39 to form a primary gas chamber 187, which is also referred to as an arc chamber or plasma chamber. The tip 40 is spaced distally from the electrode 39. A central exit orifice 188 of the tip 40 communicates with the primary gas chamber 187 for exhausting ionized gas in the form of a plasma stream from the tip 40 and directing the plasma stream down against a workpiece.

Figure 15:
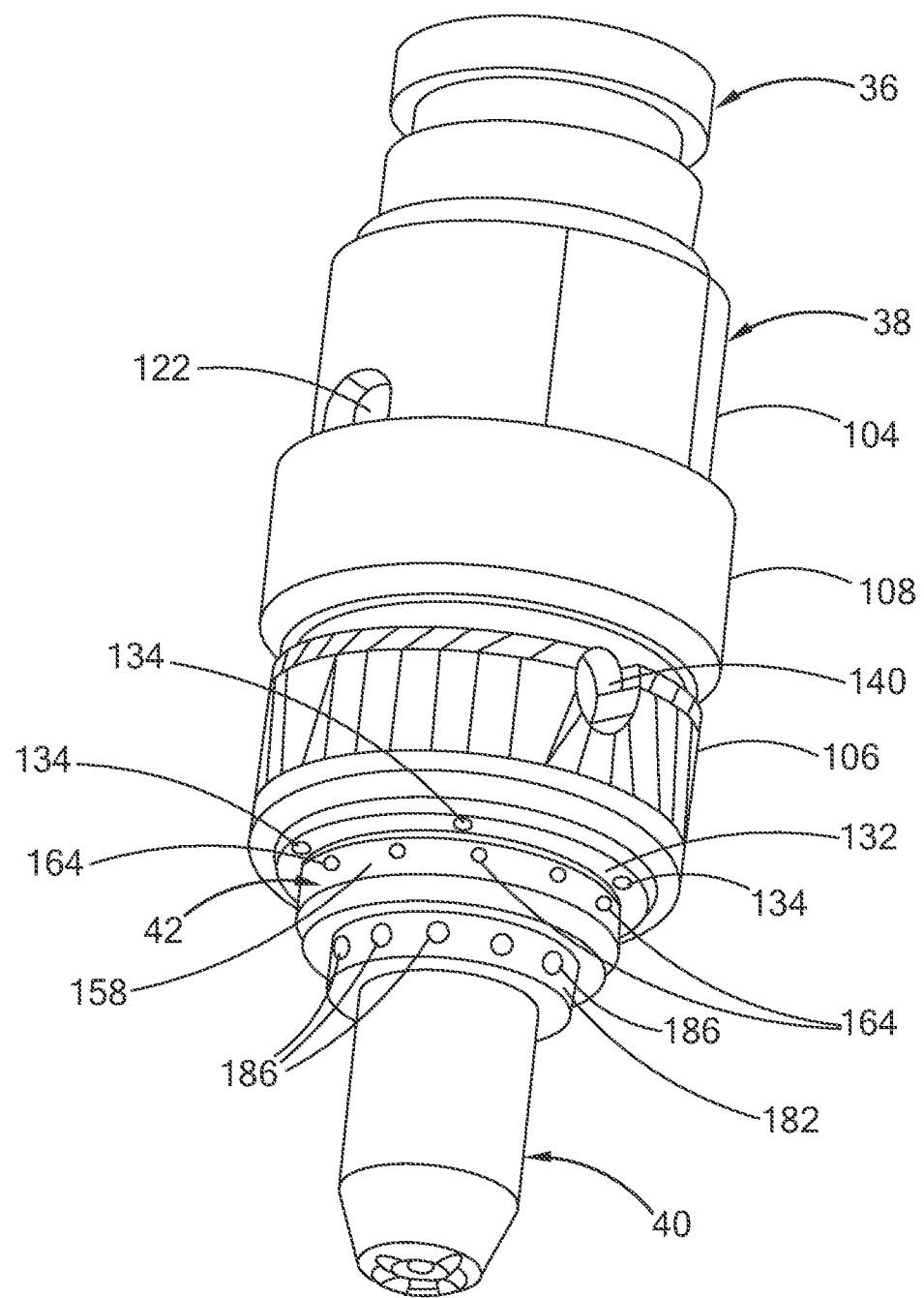
FIG. 15 is a perspective view of a torch head constructed in accordance with the principles of the present disclosure, wherein the shield cup, the insert, and the torch head housing are removed for clarity.

As shown in FIG. 15, when the insulating member 36, the anode member 38, the tip 40, and the start cartridge 42 are assembled, the distal face 132 of the annular flange 124 of the anode member 38 is disposed proximate the lower cylindrical portion 158 of the start cartridge 42 and the annular flange 182 of the tip 40. The axial vent holes 134 of the anode member 38 are in fluid communication with the radial gas holes 164 of the lower cylindrical portion 158 of the start cartridge 42 and the radial gas holes 186 of the annular flange 182 of the tip 40. Accordingly, a portion of the working gas can be directed into the radial gas holes 186 of the annular flange 182 of the tip to form plasma gas. A remaining portion of the working gas vented from the axial holes 134 of the anode member 38 can be directed into the start cartridge 42 through the radial gas holes 164 to move the initiator 152 away from the tip 40 to initiate a pilot arc.

Referring back to FIGS. 4 and 5, the shield cup 44 is positioned distally from the tip 40 and is isolated from the power supply. The shield cup 44 generally functions to shield the tip 40 and other components of the plasma arc torch 20 from molten splatter during operation of the plasma arc torch 20, in addition to directing a flow of shield gas that is used to stabilize and control the plasma stream. Additionally, the gas directed by the shield cup 44 provides additional cooling for consumable components of the plasma arc torch 20, which is described in greater detail below. The shield cup 44 is preferably made of a non-conductive, heat insulating material, such as a phenolic or ceramic.

Figure 18:
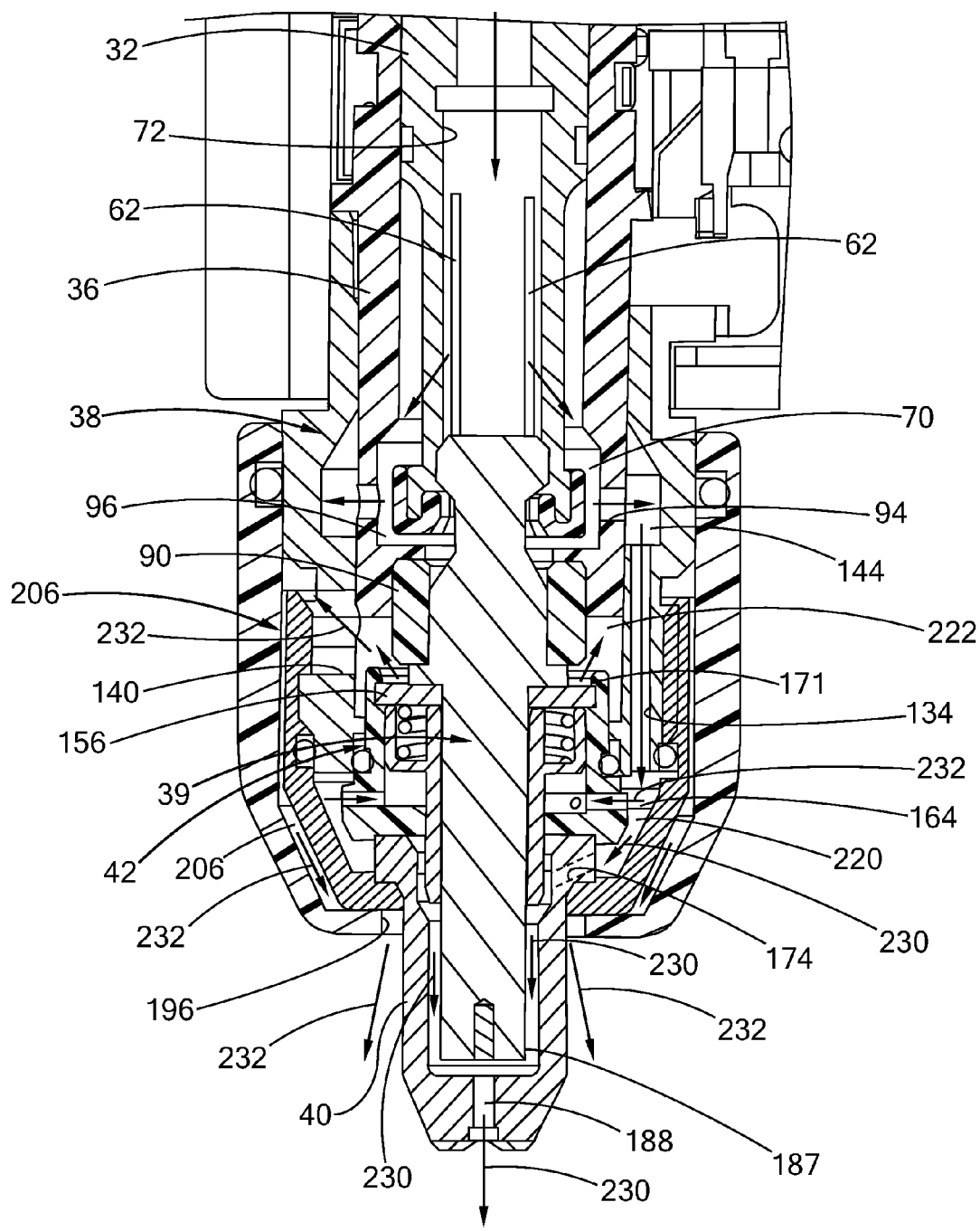
FIG. 18 is a cross-sectional view similar to FIG. 3, showing the flow paths of the working gas.

As shown, the shield cup 44 surrounds the distal end 26 of the torch head 20 and generally secures and positions the consumable components therein, in addition to insulating an area surrounding the torch head 20 from the conductive components during operation and while the power supply 14 (not shown) supplies electric power to the torch head 20. The shield cup 44 comprises a proximal portion 192 and a distal portion 194. The proximal portion 192 is configured to secure the shield cup 44 to the plasma arc torch 20. The distal portion 194 includes a distal end wall 195 defining a central orifice 196. The shield cup 44 may be secured to the anode member 38 by, e.g., threads or a quick-disconnect (not shown). An inner groove 193 is formed on an interior surface 199 of the proximal portion 192. As shown in FIGS. 4 and 18, an o-ring 197 is disposed in the inner groove 193 to seal and retain the interface between the anode member 38 and the shield cup 44.

Figure 16:
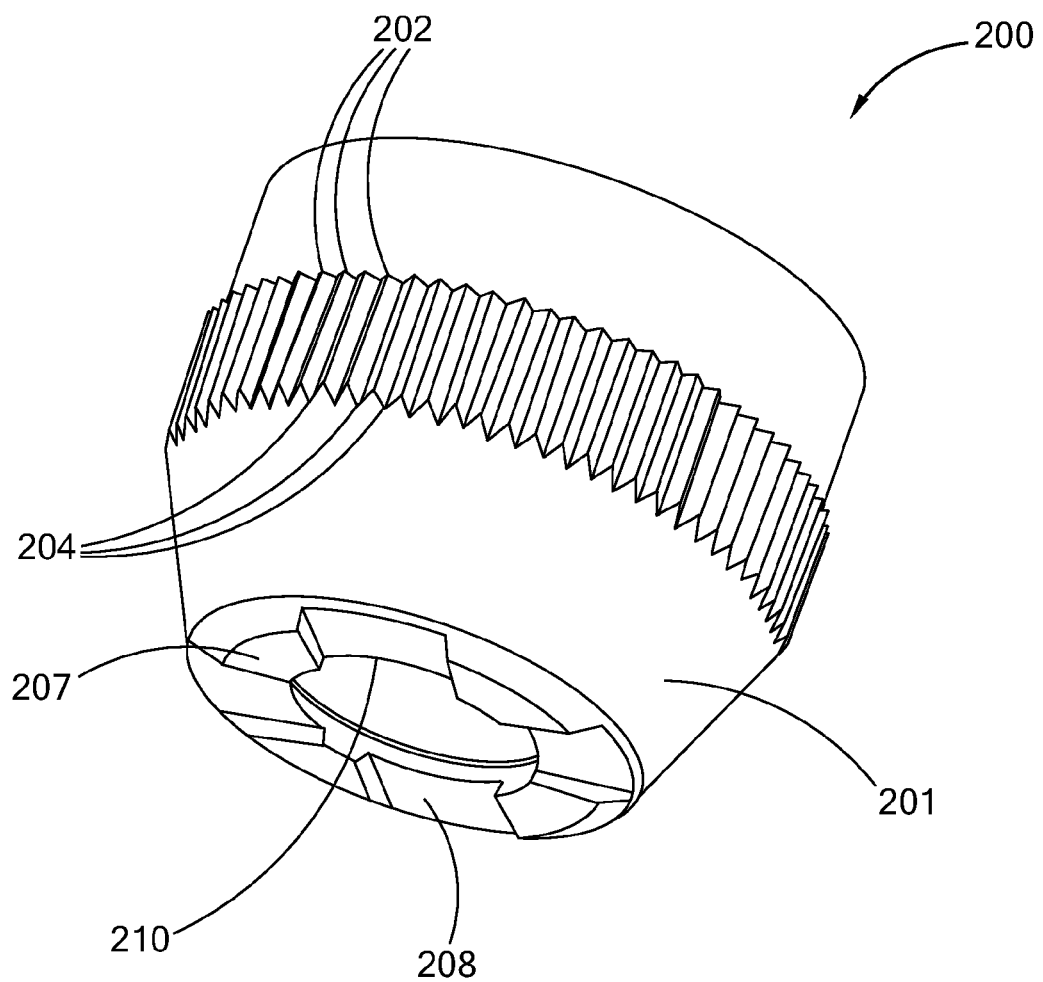
FIG. 16 is a perspective view of an insert constructed in accordance with the teaching of the present disclosure.

Referring to FIGS. 4, 5 and 16, an insert 200 is disposed in the shield cup 44 and engages the anode member 38 and the tip 40. The insert 200 is conductive in one form of the present disclosure, however, it should be understood that the insert may be nonconductive while remaining within the scope of the present disclosure. Accordingly, the tip 40 is in electrical communication with the positive, or anode, side of the power supply through the insert 200 and the anode member 38. The insert 200 comprises a conical body 201, a plurality of axial ridges 202, and axial grooves 204. The axial grooves 204 constitute a part of a shield gas passageway 206. The insert 200 further includes a distal end face 207. A plurality of recessed portions 208 are recessed from the distal end face 207.

Figure 17:
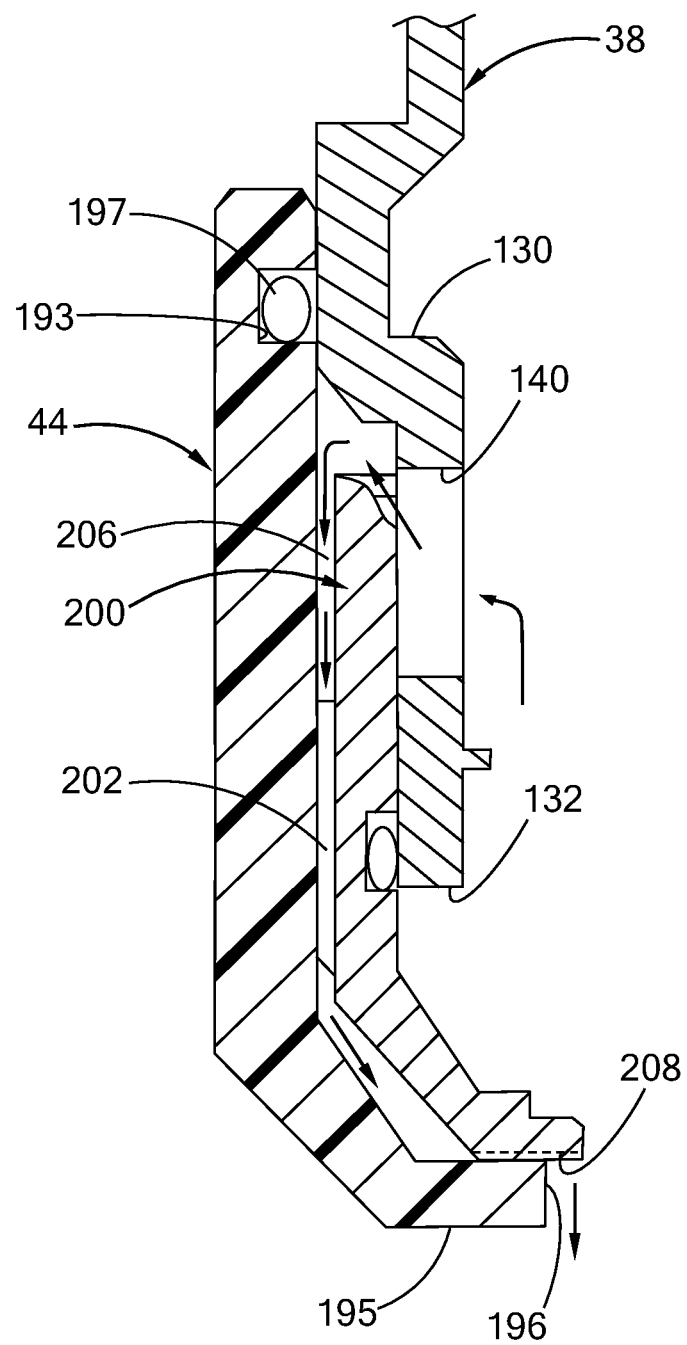
FIG. 17 is a schematic view of an anode member, an insert, and a shield cup, showing fluid communication between the shield gas passageway and the radial hole of the anode gas distributor.

Referring to FIG. 17, when the shield cup 44 and the insert 200 are secured to the torch head 20, particularly to the anode member 38, the shield gas passageway 206 is defined between the insert 200 and the shield cup 44. The anode member 38 is disposed between the start cartridge 42 and the shield cup 44. The shield gas passageway 206 is in fluid communication with the interior of the anode member 38 through the radial passageway 140 of the anode member 38. As further shown, the distal end face 207 of the insert 200 abuts against the distal end wall 195 of the shield cup 44. With the presence of the recessed portions 208, the shield gas passageway 206 is in fluid communication with the central orifice 210 of the insert 200 through the recessed portions 208. As such, the working gas vented out from the start cartridge 42 is directed into the shield gas passageway 206 and reused as a shield gas, which flows through the shield gas passageway 206 and is vented out from the central orifice 210 of the insert 200 and the central orifice 195 of the shield cup 44.

Referring to FIG. 18, in operation, and according to a method of the present disclosure, the working gas to operate the plasma arc torch 12 is directed toward the central bore 72 of the cathode body 32 from the source of gas. The torch head 20 is connected to a supply of gas and electric power. The working gas then flows through the vertical slots 62 of the cathode body 32 into the gas chamber 96 between the cathode body 32 and the insulating member 36. The gas is further directed from the gas chamber 96 through the radial vent holes 94 of the insulating member 32 into the first gas receiving chamber 144 between the insulating member 32 and the anode member 38. The working gas then flows distally into the axial vent holes 134 towards the tip 40 and enters a space 220 defined between the insert 200 and the start cartridge 42. The working gas is then split into two streams, i.e., a first stream 230 and a second stream 232.

The first stream 230 flows distally toward the annular flange 182 of the tip 40 and into the primary gas chamber 187 in the tip 40 through the radial holes 174. Accordingly, the working gas in the primary gas chamber 187 is ionized by a pilot arc formed between the initiator 152 and the tip 40. The ionized gas is blown out the central exit orifice 188 of the tip 40 in the form of a plasma stream 230.

The second stream 232 of the working gas flows through the radial gas passageways 164 of the start cartridge 42, which causes the initiator 152 to move proximally away from the tip 40, in the pilot mode of the torch. The gas pressure is sufficiently high to overcome the bias of the coil spring 154 (biasing member). As the initiator 152 moves proximally away from the tip 40, a pilot arc is drawn between the initiator 152 and the tip 40, particularly between the beveled distal contact surface 174 of the initiator 152 and the conical interior surface 185 of the tip 40.

As further shown, the gas that flows into the start cartridge 42 to move the initiator 152 proximally away from the tip 40 is vented through the cutout portions 166, or redirect gas passageways, of the restraining member 156. The working gas enters a second gas receiving chamber 222 defined between the electrode seat 90 and the anode member 38. The second gas receiving chamber 222 is in fluid communication with the radial passageway 140 of the anode member 38. Therefore, the second stream 232 of working gas that is vented out from the start cartridge 42 is re-directed into the shield gas passageway 206 through the radial passageway 140 of the anode member 38. To recycle the second stream 232 of the working gas and use the same as the shield gas, the second stream 232 of the working gas is first directed proximally outside the start cartridge 42, is redirected radially and outwardly through the anode member 38, and is redirected distally towards the tip 40. Accordingly, the second stream 232 of working gas is used to cause the initiator 152 to be separated from the tip 40 and is recycled as a shield gas flow rather than being vented to atmosphere. The shield gas flows in the shield gas passageway 206 to cool the tip 40, among other consumable components, and is directed out from the central orifice 196 of the shield cup 44 to surround the plasma gas stream to stabilize and/or control the plasma stream.

While the drawings of the present disclosure show that 100% of the second stream 232 is redirected to the shield gas passageway 206, it is understood that only a portion of the second stream 232 may be redirected into the shield gas passageway 206 and the remaining portion of the second stream 232 may be vented out to atmosphere depending on applications.

When the gas and electric power are turned off and the gas is vented as previously described, the force of the coil spring 52 causes the initiator 152 to move distally towards the tip 40 such that the conical interior surface 185 of the tip 40 and the beveled contact surface 174 of the initiator 152 come into contact. The plasma arc torch is then switched to the idle mode.

Figure 19:
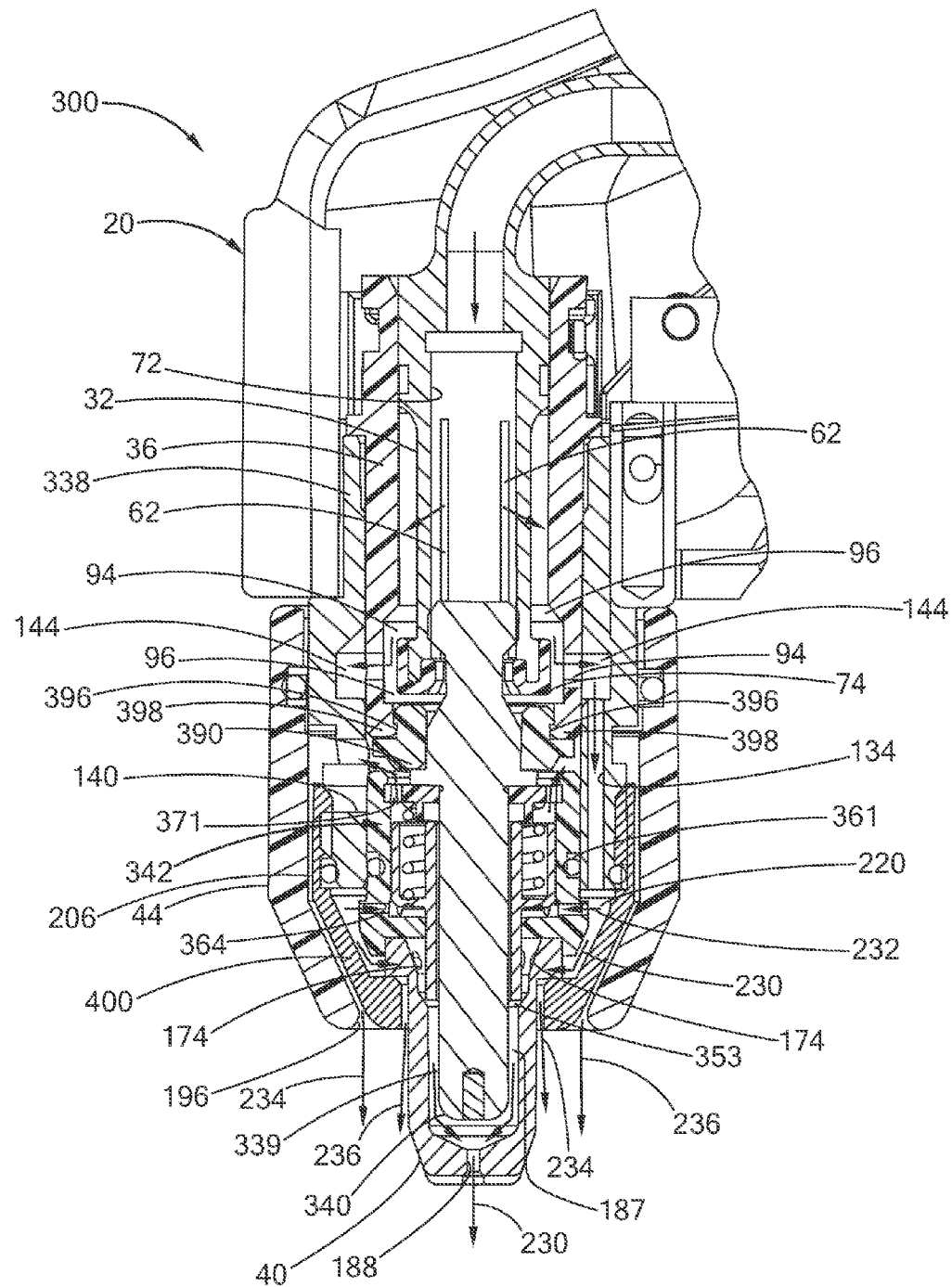
FIG. 19 is a cross-sectional view of an alternate form of a plasma arc torch constructed in accordance with the principles of the present disclosure.

Referring to FIG. 19, an alternate form of a plasma arc torch 300 constructed in accordance with principles of the present disclosure is similar to the plasma arc torch 12 of FIG. 4 except for the structure and/or arrangement of some of the consumable elements. In the following, like elements are indicated by like reference numbers and the description thereof is omitted herein for clarity.

More specifically, the plasma arc torch 300 includes a torch head 20 for mounting fixed components including a cathode body 32, an anode member 338, and an insulating member 36 disposed between the cathode body 32 and the anode member 338. A plurality of consumable components are mounted to the torch head 20, including but not limited to, an electrode 339, a tip 40, a start cartridge 342, a shield cup 44, an insert 400, and a electrode seat 390. The insert 400 is conductive in one form of the present disclosure, however, it should be understood that the insert may be nonconductive while remaining within the scope of the present disclosure.

Figure 20:
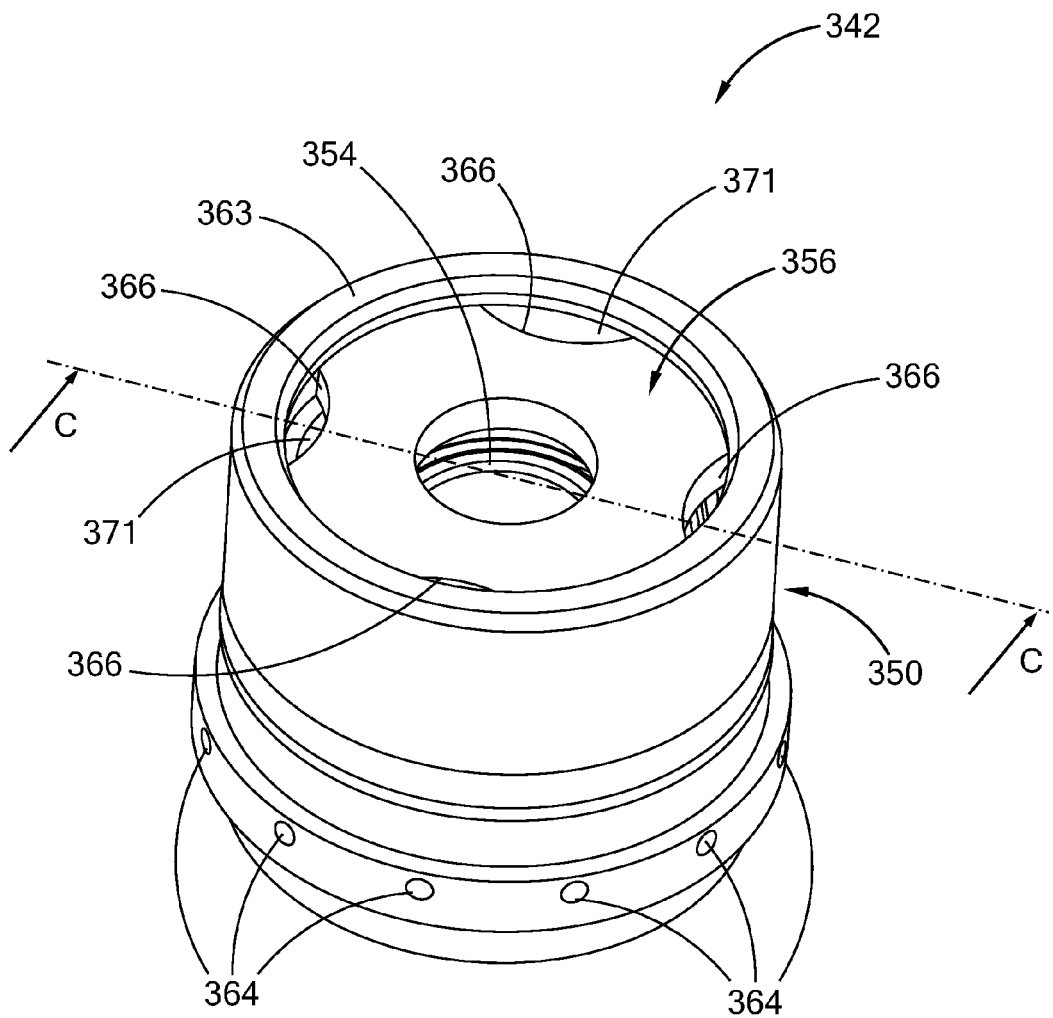
FIG. 20 is a perspective view of a start cartridge of the plasma arc torch of FIG. 19.
Figure 21:
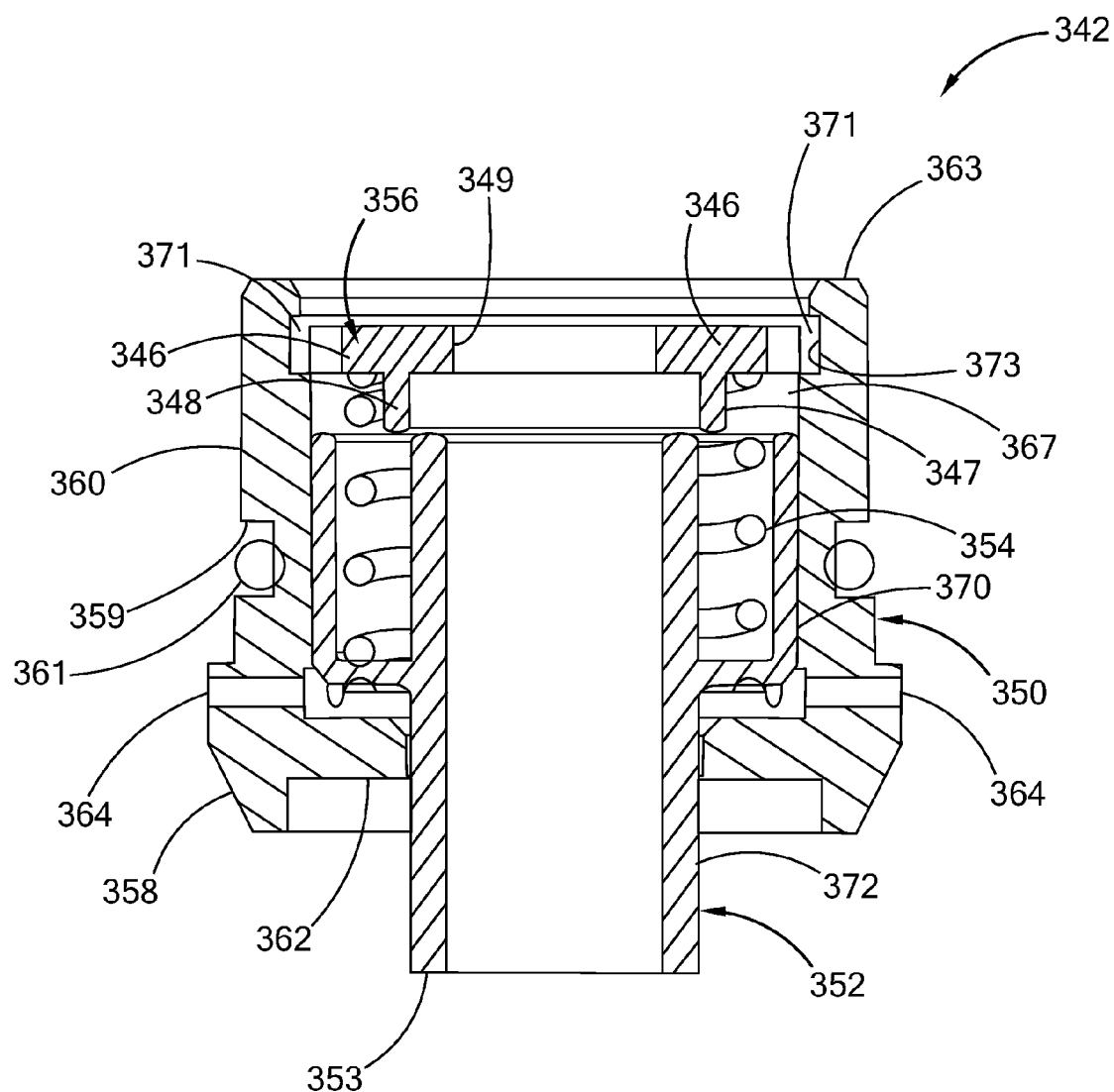
FIG. 21 is a cross-sectional view of the start cartridge, taken along line C-C of FIG. 20.
Figure 22:
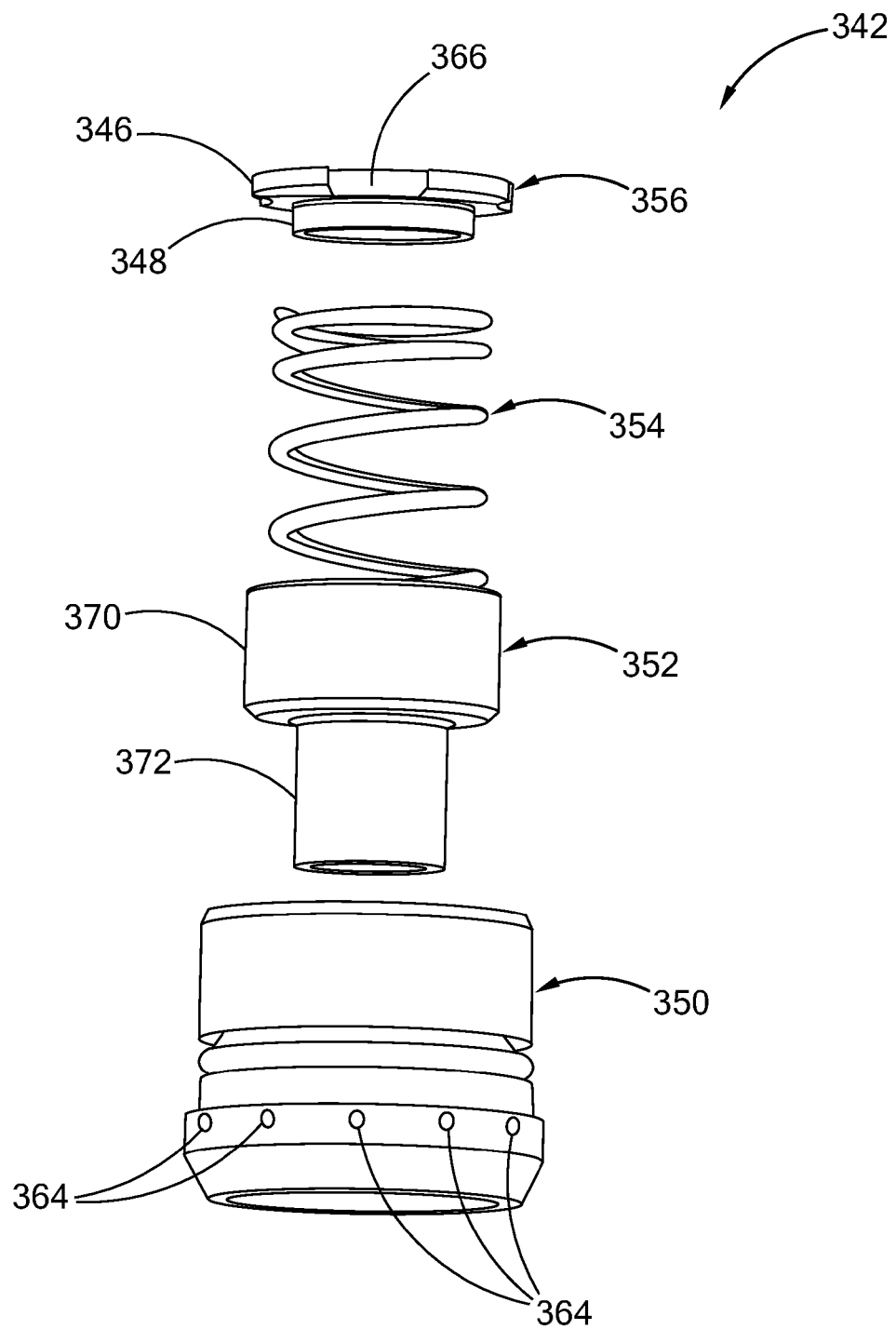
FIG. 22 is an exploded view of a start cartridge of the plasma arc torch of FIG. 19.

Referring to FIGS. 20 to 22, the start cartridge 342 includes a cartridge body 350, an initiator 352, a coil spring 354, and a restraining member 356. The cartridge body 350 comprises a lower cylindrical portion 358, an upper cylindrical sidewall 360, and a recessed end wall 362 housed within the lower cylindrical portion 358. The upper cylindrical sidewall 360 is disposed inside the anode member 338. The lower cylindrical portion 358 is disposed outside the anode member 338. An annular groove 359 is defined between the upper cylindrical sidewall 360 and the lower cylindrical portion 358 for receiving an o-ring 361. The o-ring 361 seals and retains the interface between the start cartridge 342 and the anode member 338.

The upper cylindrical sidewall 362 defines a cartridge chamber 367 for receiving the coil spring 354 and a portion of the initiator 352. The cartridge body 350 further defines a series of radial gas holes 364 that extend radially through the lower cylindrical portion 358. The series of radial gas holes 364 direct a portion of the working gas into the cartridge chamber 367 of the cartridge body 350 to move the initiator 352 away from the tip 40 against the bias of the coil spring 354. Unlike the cartridge body of FIGS. 12 to 14, the cartridge body 350 has a flat proximal face 363.

The initiator 352 includes an upper cylindrical portion 370, and a tubular portion 372. The electrode 339, which has a round distal surface 340 (FIG. 19), is disposed through the upper cylindrical portion 370 and the tubular portion 372. The coil spring 354 is housed within the upper cylindrical portion 370 of the initiator 352 and between the initiator 352 and the restraining member 356. The initiator 352 is axially movable relative to the tip 40 along a central longitudinal axis X of the torch head 20 and within the cartridge chamber 367 of the start cartridge 342. When the initiator 352 is pushed away from the tip 40 by the gas entering the cartridge chamber 367 through the plurality of gas holes 364, a pilot arc is generated between the contact end face 353 of the initiator 352 and the tip 40. The contact end face 353 is not beveled like that of FIGS. 12 to 14.

The restraining member 356 is provided with a plurality of cutout portions 366 such that the plurality of redirect gas passageways 371 are defined between the restraining member 356 and the cartridge body 350. Unlike the restraining member 56 of FIGS. 12 to 14, the restraining member 356 in the present embodiment, includes an upper plate portion 346, a lower cylindrical portion 348 and a central opening 349 through the upper plate portion 346 and the lower cylindrical portion 348. A portion of the coiled spring 354 surrounds the lower cylindrical portion 348 of the restraining member 356. The upper plate portion 346 is secured to the upper cylindrical sidewall 360 of the cartridge body 350 by inserting the upper plate portion 346 into an inner peripheral groove 370 in the upper cylindrical sidewall 360.

Figure 23:
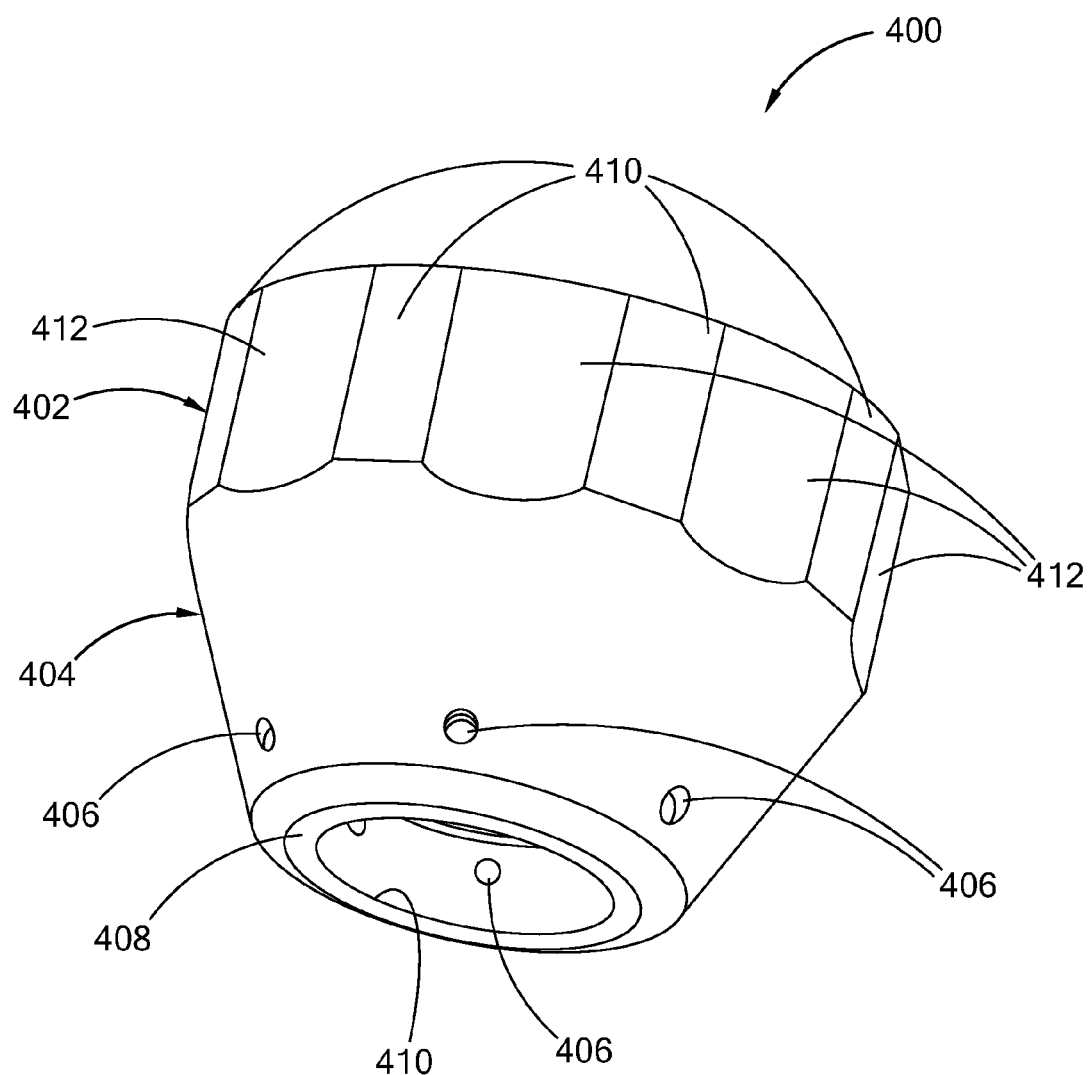
FIG. 23 is a perspective view of an insert of the plasma arc torch of FIG. 19.

Referring to FIG. 23, the insert 400 includes an undulated section 402 and a lower tapered section 404. The undulated section 402 includes a plurality of raised portions 410 and recessed portions 412 so that when the insert 400 is mounted to the torch head 20 and disposed within the shield cup 44, the recessed portions 412 define a part of the shield gas passageways 206. A plurality of radial gas passageways 406 are formed through the lower tapered portion 404 proximate an end distal face 408. The insert 400 defines a central orifice 410.

Figure 24:
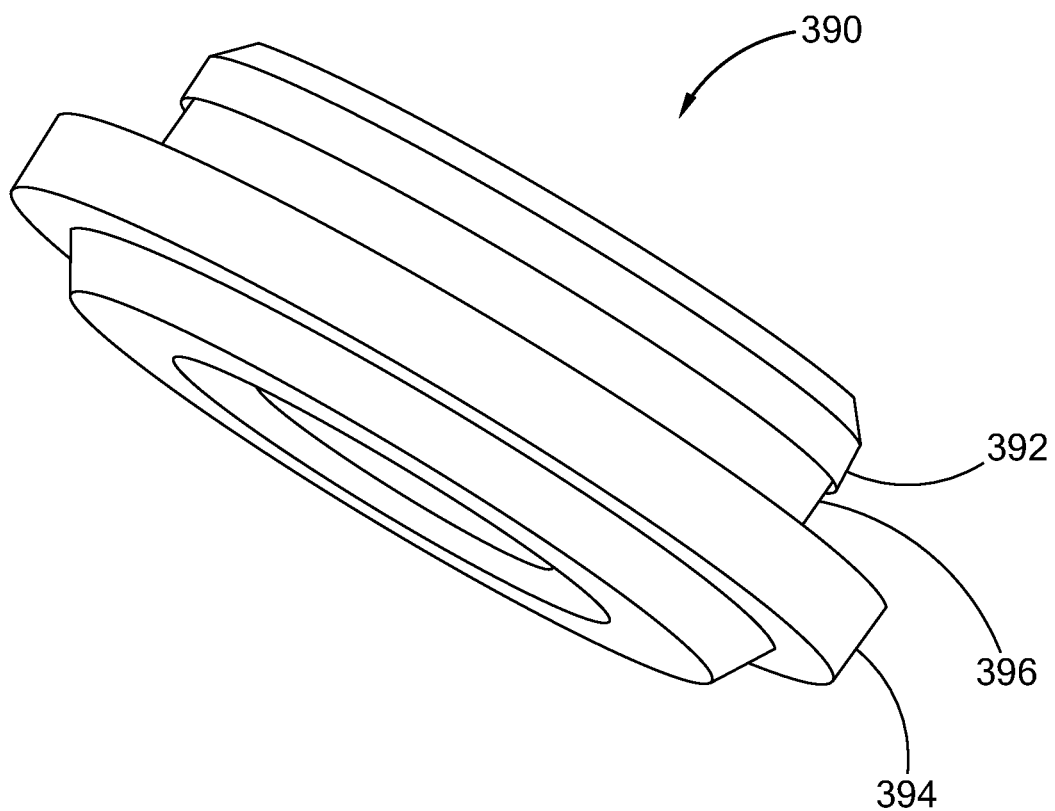
FIG. 24 is a perspective view of an electrode seat of the plasma arc torch of FIG. 19.

Referring to FIG. 24, the electrode seat 390 is disposed between the insulating member 36 and the electrode 339 and includes an upper flange 392, a lower flange 394, and a recessed portion 396 therebetween. As clearly shown in FIG. 19, when the electrode seat 390 is disposed in the insulating member 36, a snap-fit can be achieved by engaging an inner peripheral projection 398 of the insulating member 36 to the recessed portion 396 of the electrode seat 390, resulting in a more secured engagement between the insulating member 36 and the electrode seat 390.

Figure 10:
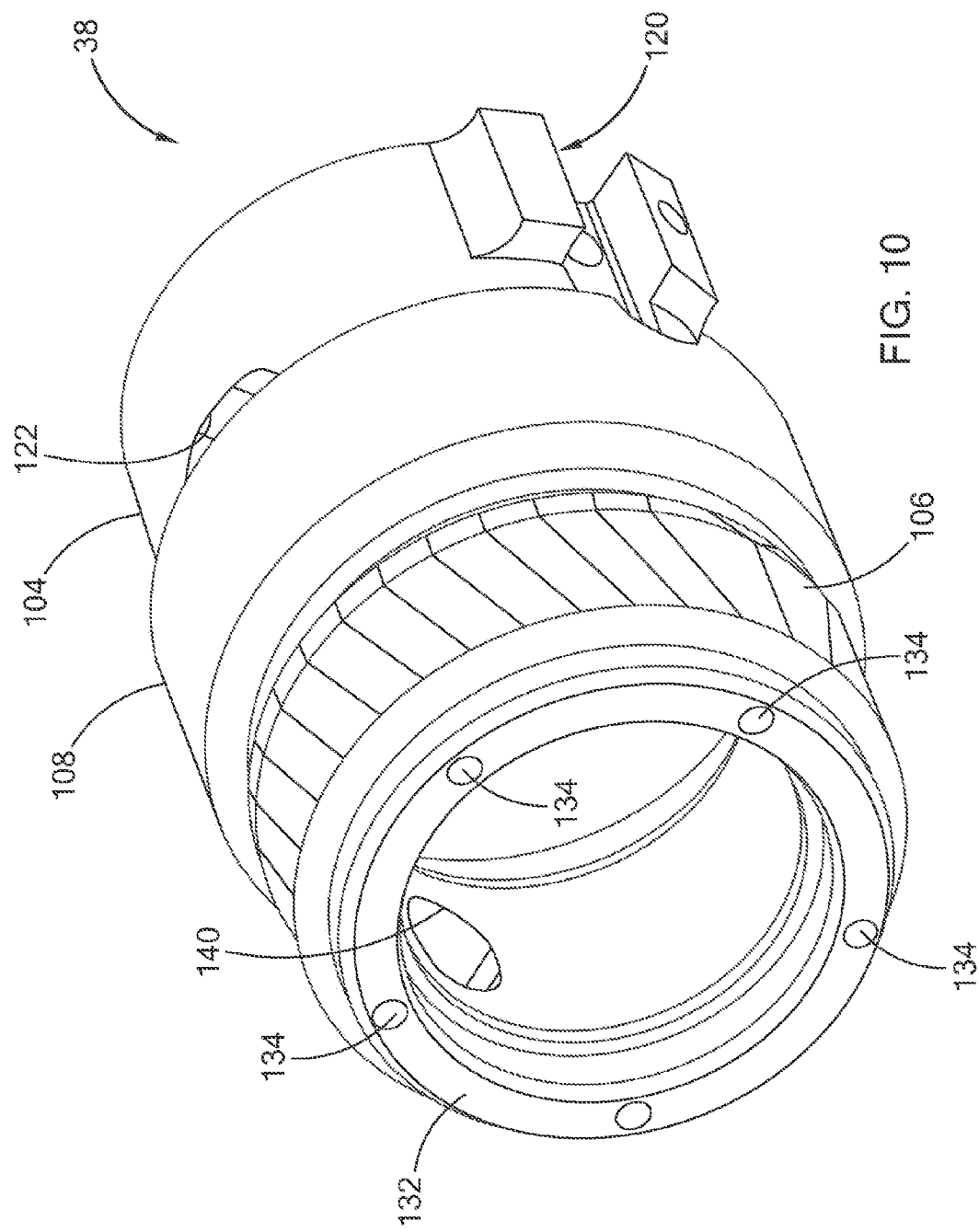
Figure 25:
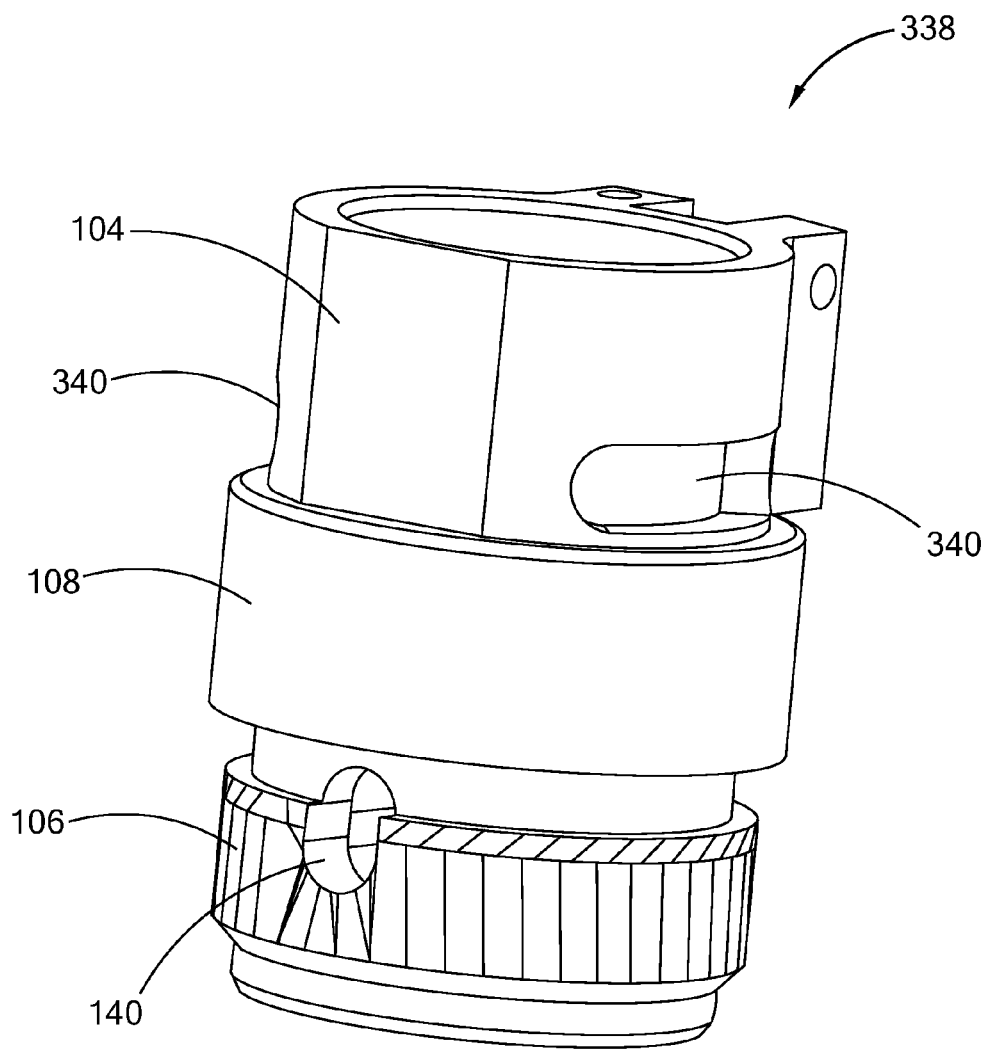
FIG. 25 is a perspective view of an anode member of the plasma arc torch of FIG. 19.

Referring to FIG. 25, the anode member 338 is similar to the anode member 38 of FIGS. 9 to 11, except for the shape of the positioning recesses 340. Like the anode member 38 of FIGS. 9 to 11, the anode member 338 includes an upper cylindrical wall 104, a lower cylindrical wall 106, and an intermediate cylindrical wall 108. Unlike the anode member 38 of FIGS. 9 to 11, the anode member 338 defines a pair of positioning recesses 340 dispose diametrically and having an elongated shape along the circumference of the cylindrical body 104 of the anode member 338.

Referring to FIG. 19, in operation and according to another method of the present disclosure, the working gas to operate the plasma arc torch 300 is directed toward the central bore 72 of the cathode body 32 from the source of gas. The working gas then flows through the vertical slots 62 of the cathode body 32 into the gas chamber 96 between the cathode body 32 and the insulating member 36. The gas is further directed from the gas chamber 96 through the radial vent holes 94 of the insulating member 32 into the first gas receiving chamber 144 between the insulating member 32 and the anode member 338. The working gas then flows distally into the axial vent holes 134 of the anode member 338 towards the tip 40 and enters a space 220 defined between the insert 400 and the start cartridge 342. The working gas is then split into two streams, i.e., a first stream 230 and a second stream 232.

The first stream 230 flows distally toward the tip 40 and into the primary gas chamber 187 in the tip 40 through the radial holes 174 of the tip 40 to form ionized gas, which is blown out the central exit orifice 188 of the tip 40 in the form of a plasma stream 230.

The second stream 232 of the working gas flows through the radial gas passageways 364 of the start cartridge 342, which overcomes the biasing force of the coil spring 354 to move the initiator 352 proximally away from the tip 40, resulting in a pilot arc drawn between the initiator 352 and the tip 40, particularly between the flat distal contact surface 353 of the initiator 352 and the tip 40.

Next, the second stream 232 continues to be vented through the redirect gas passageways 371 and the radial passageway 140 of the anode member 238. In the present embodiment, the radial passageway 140 of the anode member 238 is closer to one of the redirect gas passageways 371 so that the second stream 232 vented from the start cartridge 242 can quickly flow through the radial passageway 140 and re-directed into the shield gas passageway 206 between the insert 400 and the shield cup 44. The second stream is recycled to be used as a shield gas to cool the tip 40, among other consumable components. The second stream flows along an outer surface of the insert 400 and flows distally from the undulated section 402 toward the tapered section 404. A first portion 234 of the shield gas continues to flow distally and vented outside the plasma arc torch 300 through the central orifice 196 of the shield cup 44. A second portion 236 of the shield gas flows radially and inwardly through the radial passageways 406 of the insert 400 and enters the insert 400. The second portion 236 of the shield gas is then vented outside the plasma arc torch 300 through the central orifice 410 of the insert 400.

The plasma arc torches 12 and 130 constructed in accordance with the principles of the present disclosure demand less working gas than a typical plasma arc torch. In a typical plasma arc torch, the working gas from a source of gas is generally split into three streams to perform three different functions. The first stream flows through the central orifice of the tip and ionized to form a plasma gas. The second stream is used to separate the anode (or "tip"/"nozzle") from the cathode (or "electrode") to draw an arc therebetween. The third stream is directed down around the outside of the tip to function as a "secondary" or "shield gas" to stabilize the plasma gas and to cool the tip.

Generally, a relatively high percentage of the total working gas is used to cause the tip or an anode to be separated from the electrode or a cathode in many plasma arc torches in the art. For example, approximately 15% of the total working gas is used to form the plasma gas, approximately 30% of the total working gas is used as shield gas, and approximately 55% of the total working gas is used to draw the pilot arc and then is vented out to atmosphere. Accordingly, a significant amount of the working gas is wasted through venting.

In contrast, the plasma arc torches 12 and 300 constructed in accordance with the principles of the present disclosure use two streams of working gas, although more or less could be used in order to effectuate the recycling for shield gas. The first stream is used to form the plasma stream. The second stream is used to actuate the start cartridges 42 and 342 to draw a pilot arc and is then redirected to the shield gas passageway to be recycled as a part of the shield gas. As such, the second stream of working gas used to move the initiators 152 and 352 and draw the pilot arc is not vented outside the plasma arc torch, and thus is not wasted during operation. The first stream may be approximately 25% of the total working gas and the second stream may be approximately 75% of the working gas from the source of gas. The second stream that is used to move the initiators 152 and 352 and redirected to be used as the shield gas is approximately three times the first stream that is used to form the plasma gas. Accordingly, the total amount of working gas required for operating the plasma arc torches 12 and 300 may be reduced. Additionally, a smaller torch lead, smaller gas tubing, and a smaller compressor may be used with the plasma arc torches 12 and 300 constructed in accordance with the principles of the present disclosure, resulting in reduced operating costs.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating a plasma arc torch comprising:
providing a source of gas and electric power;
directing a first portion of gas flowing from the source of gas into a plasma chamber;
directing a second portion of the gas flowing from the source of gas to initiate a pilot arc in the plasma chamber; and
redirecting the second portion of the gas to form at least a portion of a shield gas flow rather than venting the second portion to atmosphere, wherein the second portion of gas is redirected outwardly and then distally toward an exit orifice of the tip.

2. The method according to claim 1, wherein the second portion of gas is redirected through a start cartridge of a contact start plasma arc torch.

3. The method according to claim 1, wherein the second portion of gas that is redirected flows proximally, then radially outwards, then distally inner towards the tip.

4. The method according to claim 3, wherein the second portion of gas that is redirected flows proximally through a start cartridge of a contact start plasma arc torch.

5. The method according to claim 3, wherein the second portion of gas that is redirected flows radially and outwardly through an anode member to form the at least a portion of the shield gas flow.

6. The method according to claim 1, further comprising redirecting 100% of the second portion of the gas flowing from the source of gas to form the shield gas flow.

7. The method according to claim 1, wherein the amount of the second portion of the gas from the source of gas is equal to the amount of the shield gas flow.

8. The method according to claim 1, wherein the shield gas flow is approximately three times the first portion of gas flowing from the source of gas into the plasma chamber.

9. The method according to claim 1, wherein the first portion is approximately 25% of the gas flowing from the source of gas, and second portion is approximately 75% of the gas flowing from the source of gas.

10. A method of operating a plasma arc torch comprising redirecting a portion of working gas that is used to initiate a pilot arc through passageways to form at least a portion of a shield gas flow rather than venting the working gas to atmosphere the portion of working gas is redirected outwardly through the passageways and then distally toward an exit orifice of the tip.

11. A method of operating a plasma arc torch comprising:
providing a source of gas and electric power;
directing a first portion of gas flowing from the source of gas into a plasma chamber;
directing a second portion of the gas flowing from the source of gas to initiate a pilot arc in the plasma chamber; and
redirecting a portion of the second portion of the gas to form at least a portion of a shield gas flow, wherein the second portion of gas is redirected outwardly and then distally toward an exit orifice of the tip.

12. The method according to claim 11, further comprising directing the source gas radially outward through a passage of a cathode body and insulating member into a first gas receiving chamber and flowing distally into a plurality of axial vent holes toward a tip.

13. The method according to claim 12, wherein the source gas exiting the plurality of axial vent holes is divided into the first portion of gas and the second portion of gas.

14. The method according to claim 13, further comprising directing the first portion of gas into a primary gas chamber between an electrode and the tip.

15. The method according to claim 14, further comprising moving an initiator proximately away from the tip by directing at least a portion of the second portion of gas into to a start cartridge to overcome a bias of a biasing member separating an initiator from the tip.

16. The method according to claim 15, further comprising ionizing the first portion of gas and exiting a plasma stream from an exit orifice.

17. The method according to claim 15, the second portion of gas that is redirected flows proximally out of the start cartridge, then radially outwards, then distally towards the tip to form the shield gas flow.

18. The method according to claim 11, further comprising redirecting 100% of the second portion of the gas flowing from the source of gas to form the shield gas flow.

19. The method according to claim 11, wherein the first portion is approximately 25% of the gas flowing from the source of gas, and second portion is approximately 75% of the gas flowing from the source of gas.

20. The method according to claim 11, further comprising redirecting a portion of the second portion of gas that is used to initiate the pilot arc through passageways to form at least a portion of a shield gas flow rather than venting the working gas to atmosphere.

* * * * *